United States Patent
Bai et al.

(10) Patent No.: US 11,232,350 B2
(45) Date of Patent: Jan. 25, 2022

(54) SYSTEM AND METHOD FOR PROVIDING ROAD USER CLASSIFICATION TRAINING USING A VEHICLE COMMUNICATIONS NETWORK

(71) Applicant: Honda Motor Co., Ltd., Tokyo (JP)

(72) Inventors: Xue Bai, Novi, MI (US); Samer Rajab, West Bloomfield, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 1093 days.

(21) Appl. No.: 15/826,561

(22) Filed: Nov. 29, 2017

(65) Prior Publication Data

US 2019/0164049 A1 May 30, 2019

(51) Int. Cl.
- *G06N 3/08* (2006.01)
- *H04L 29/08* (2006.01)
- *G06N 3/04* (2006.01)

(52) U.S. Cl.
CPC ............. *G06N 3/08* (2013.01); *G06N 3/0427* (2013.01); *H04L 67/12* (2013.01)

(58) Field of Classification Search
CPC .......... G06N 3/08; G06N 3/0427; G06N 3/04; H04L 67/12; G08G 1/166; G08G 1/164
See application file for complete search history.

(56) References Cited

U.S. PATENT DOCUMENTS

| | | | |
|---|---|---|---|
| 8,229,663 B2 | 7/2012 | Zeng et al. | |
| 9,545,924 B2 | 1/2017 | Yoon | |
| 10,602,242 B2 * | 3/2020 | Zeng | G01S 13/931 |
| 2007/0043506 A1 * | 2/2007 | Mudalige | B60T 7/22 |
| | | | 701/301 |
| 2012/0101681 A1 * | 4/2012 | Wagner | B60T 8/172 |
| | | | 701/29.2 |
| 2015/0286754 A1 | 10/2015 | Stahlin et al. | |
| 2016/0096270 A1 * | 4/2016 | Ibarz Gabardos | B25J 9/161 |
| | | | 700/253 |
| 2016/0321924 A1 | 11/2016 | Lewis et al. | |
| 2017/0025012 A1 | 1/2017 | Thompson et al. | |
| 2017/0053530 A1 | 2/2017 | Gogic et al. | |
| 2017/0200370 A1 * | 7/2017 | Miller | G08G 1/162 |
| 2017/0214747 A1 | 7/2017 | Schulte et al. | |

(Continued)

FOREIGN PATENT DOCUMENTS

WO 2017033486 3/2017

*Primary Examiner* — Joseph H Feild
*Assistant Examiner* — Rufus C Point
(74) *Attorney, Agent, or Firm* — Rankin, Hill & Clark LLP

(57) ABSTRACT

A system and method for providing road user classification training using a vehicle communications network that include analyzing sensor data to determine a sensor classification of at least one road user. The system and method also include analyzing at least one message that is received through the vehicle communications network to determine a vehicle-to-everything (V2X) classification of the at least one road user. The system and method additionally include determining if a variance exists between the V2X classification of the at least one road user and the sensor classification of the at least road user. The system and method further include training a neural network with classification variance data upon determining that the variance exists between the V2X classification and sensor classification.

20 Claims, 6 Drawing Sheets

(56) References Cited

U.S. PATENT DOCUMENTS

| | | | |
|---|---|---|---|
| 2018/0068206 A1* | 3/2018 | Pollach | G06K 9/6289 |
| 2018/0180708 A1* | 6/2018 | Vijaya Kumar | G01S 19/51 |
| 2018/0182242 A1* | 6/2018 | Vijaya Kumar | G06K 9/00805 |
| 2018/0342065 A1* | 11/2018 | Hovis | G05D 1/0088 |
| 2019/0102840 A1* | 4/2019 | Perl | B60W 40/09 |
| 2019/0297173 A1* | 9/2019 | Nunna | H04L 69/08 |
| 2020/0242922 A1* | 7/2020 | Dulberg | G08G 1/164 |
| 2020/0284883 A1* | 9/2020 | Ferreira | G01S 7/4816 |

* cited by examiner

SYSTEM AND METHOD FOR PROVIDING ROAD USER CLASSIFICATION TRAINING USING A VEHICLE COMMUNICATIONS NETWORK

BACKGROUND

Some vehicles use onboard sensors such as cameras to detect and classify objects such as road users that may include other vehicles or pedestrians on a roadway for automated driving and alerting functions. The sensors may provide information that may be used to classify the road users on the roadway. An issue may arise when the sensors detect the road users but data provided by the sensors is not usable to classify the road users as specific types/categories of vehicles and/or pedestrians with much confidence. In many cases, vehicle systems have to be manually trained so that the sensors may properly classify the road users which results in an inefficient and tedious process of pre-programming the vehicle systems to be used to classify the road users. Additionally, in some cases, this manual training may only be conducted prior to the vehicles being used in production or when the vehicles are taken out of production, thereby rendering sensor detection incapable of providing up-to-date classifications of the road users.

BRIEF DESCRIPTION

According to one aspect, a computer-implemented method for providing road user classification training using a vehicle communications network that includes analyzing sensor data to determine a sensor classification of at least one road user. The sensor data is provided by the vehicle and analyzed by a neural network to determine the sensor classification. The computer-implemented method also includes analyzing at least one message that is received through the vehicle communications network to determine a vehicle-to-everything (V2X) classification of the at least one road user. The at least one message is associated with the at least one road user. The method further includes determining if a variance exists between the V2X classification of the at least one road user and the sensor classification of the at least road user and training the neural network with classification variance data upon determining that the variance exists between the V2X classification and sensor classification. Training the neural network with the classification variance data supplements the variance that exists between the V2X classification and the sensor classification of the at least one road user.

According to another aspect, a system for providing road user classification training using a vehicle communications network that includes a memory storing instructions when executed by a processor cause the processor to analyze sensor data to determine a sensor classification of at least one road user. The sensor data is provided by the vehicle and analyzed by a neural network to determine the sensor classification. The instructions also cause the processor to analyze at least one message that is received through the vehicle communications network to determine a vehicle-to-everything (V2X) classification of the at least one road user. The at least one message is associated with the at least one road user. The instructions further cause the processor to determine if a variance exists between the V2X classification of the at least one road user and the sensor classification of the at least road user and train the neural network with classification variance data upon determining that the variance exists between the V2X classification and sensor classification. Training the neural network with the classification variance data supplements the variance that exists between the V2X classification and the sensor classification of the at least one road user.

According to still another aspect, a computer readable storage medium storing instructions that when executed by a computer, which includes at least a processor, causes the computer to perform a method that includes analyzing sensor data to determine a sensor classification of at least one road user. The sensor data is provided by a vehicle and analyzed by a neural network to determine the sensor classification. The instructions also include analyzing at least one message that is received through a vehicle communications network to determine a vehicle-to-everything (V2X) classification of the at least one road user. The at least one message is associated with the at least one road user. The instructions further include determining if a variance exists between the V2X classification of the at least one road user and the sensor classification of the at least road user and training the neural network with classification variance data upon determining that the variance exists between the V2X classification and sensor classification. Training the neural network with the classification variance data supplements the variance that exists between the V2X classification and the sensor classification of the at least one road user.

DETAILED DESCRIPTION

Figure 1:
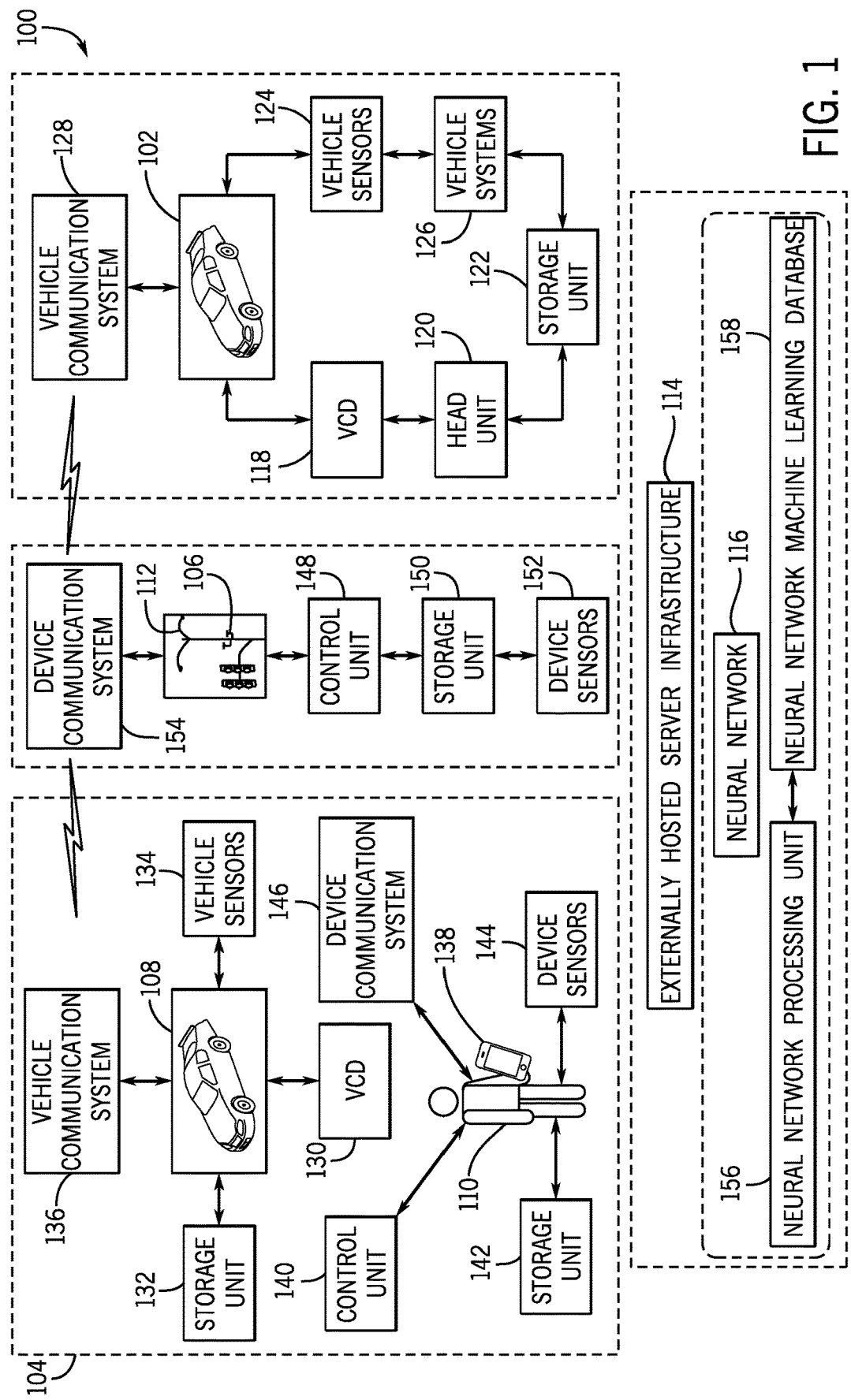
FIG. 1 is a schematic view of an operating environment for implementing the systems and methods for providing road user classification using a vehicle communications network according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers. The portable device may additionally include a wearable computing device that includes, but is not limited to, a computing device component (e.g., a processor) with circuitry that can be worn by and/or in possession of a user. Exemplary wearable computing devices can include, but are not limited to, watches, glasses, clothing, gloves, hats, shirts, jewelry, rings, earrings necklaces, armbands, shoes, earbuds, headphones and personal wellness devices.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles "Vehicle system" as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods described herein are generally directed to providing object classification training using a vehicle communications network. In an exemplary embodiment, the vehicle communications network may utilize one or more V2X communications protocols described herein that may be implemented using, but may not be limited to using vehicle-to-everything (V2X) communication in the form of a vehicle-to-vehicle (V2V) communication protocol, a vehicle-to-infrastructure (V2I) communication protocol, and a V2X communication protocol. In some embodiments, the vehicle communication may be implemented using Dedicated Short Range Communications (DSRC). It is understood that the V2X communications protocols described herein may be implemented with any communication or network protocol, for example, ad hoc networks, wireless access within the vehicle, cellular networks, Wi-Fi networks (e.g., IEEE 802.11), Bluetooth®, among others.

As discussed below, the systems and methods may specifically utilize one or more of the V2X communications protocols to provide communications between a host vehicle, one or more road users, and/or roadside equipment (RSE) associated with a roadway infrastructure through the vehicle communications network. As discussed in detail below, a respective data associated with one or more road users may be communicated to the host vehicle via the vehicle communications protocol(s) and may be utilized to train a neural network (e.g., machine learning network) to more accurately classify one or more objects that include the one or more road users based on a variance that is determined between a sensor based classification and a V2X based classification of the one or more objects. This functionality may provide up-to-date sensor based classifications (i.e., sensor classifications) of the one or more road users that may be utilized by the host vehicle to provide various functionality including, but not limited to, vehicle system functions, driving related alerts, and/or autonomous driving functionality.

Referring now to the drawings, wherein the showings are for purposes of illustrating one or more exemplary embodiments and not for purposes of limiting same, FIG. 1 is a schematic view of an operating environment 100 for implementing the systems and methods for providing road user classification using a vehicle communications network according to an exemplary embodiment. The components of the environment 100, as well as the components of other systems, hardware architectures, and software architectures discussed herein, may be combined, omitted, or organized into different architectures for various embodiments.

Generally the environment 100 may include the host vehicle (vehicle) 102, one or more additional road users 104 (road user), and the RSE 106 that may communicate amongst one another using V2X communication. In an exemplary embodiment, the road user(s) 104 may include one or more target vehicles 108. The target vehicle(s) 108 may include, but is not be limited to, a passenger car, a truck, a bus, a motor cycle, and the like. Additionally, the road user(s) 104 may include one or more non-vehicular road users (NVRU) 110. The NVRU(s) 110 may include an individual(s) traveling on foot in one or more manners (e.g., walking pedestrians, running pedestrians) or individual(s) travelling using a mobility device, for example, a bike, roller skates, a skateboard, a scooter, a stroller, a wheelchair, and an electric scooter. In one or more embodiments, the drivers of the vehicle 102 and the target vehicle(s) 108 may use (e.g., in possession of, worn by the driver(s)) a portable device(s) (not shown) that may be utilized to communicate using V2X communication. Additionally, the NVRU(s) may use (e.g., in possession of, worn by the NVRU(s)) a portable device(s) 138 that may be utilized to communicate using V2X communication. For instance, in some configurations, the functionality of providing the road user classification using a vehicle communications network may be completed based on V2X communications between the portable device(s) utilized by the driver of the vehicle 102 and portable device(s) utilized by the driver(s) of the target vehicle(s) 108 and/or portable device(s) 138 used by the NVRU(s) 110.

As discussed below, the vehicle 102 may directly communicate with the road user(s) 104 that are identified to be located within a surrounding environment of the vehicle 102 based on the identification of the road user(s) 104. In one or more embodiments, the surrounding environment of the vehicle 102 may include a dynamic vicinity around the vehicle 102 that may change based on one or more roadways that are being traveled by the vehicle 102 and/or are located a dynamically changing distance from the vehicle 102. For example, the surrounding environment of the vehicle 102 may include roadways that form a traffic intersection at which the vehicle 102 is located.

In one embodiment, the identification of the road user(s) 104 located within the surrounding environment of the vehicle 102 may be completed based on sensing of the road user(s) 104 and/or communications completed through one or more V2X communications protocols on the vehicle communications network. As discussed below, data communicated by the road user(s) 104 to the vehicle 102 through one or more V2X communications protocols may include, but may not be limited to, object categorization information. The object categorization information may include, but may not be limited to, a type of target vehicle(s) 108, a type of NVRU(s) 110), road user attribute information that may include, but may not be limited to dimensions of the target vehicle(s) 108, physical profile of the NVRU(s) 110), dynamics information such as speed, direction, heading of the target vehicle(s) 108 and/or the NVRU(s) 110, and/or environmental information that may include, but may not be limited to vehicle lighting, usage of horn by the target vehicle(s) 108, biometric information associated with the NVRU(s) 110, active use of the portable device(s) by the driver(s) of the target vehicle 108, active use of the portable device(s) 138 by the NVRU(s)) and subjective data that may include, but may not be limited to an expected travel schedule (bus schedules), number of seats, various lighting configurations, various alerts provided by various components, stored traveling paths, and subject biometric values associated to the one or more respective road users 104.

In one embodiment, the RSE 106 may be operably connected to the roadway infrastructure 112. The roadway infrastructure 112 may include, but may not be limited to, a traffic light, a lamp post, a road sign, and the like. In one configuration the RSE 106 may be physically connected to the roadway infrastructure and may be positioned to sense (e.g., capture) a birds-eye/overhead view of the surrounding environment of the vehicle 102 when the vehicle 102 is located within a proximity (e.g., within 300 yards) of the roadway infrastructure 112. The RSE 106 may be configured to communicate with the vehicle 102 using the V2I communication protocol to communicate V2I message(s) that apply to the one or more road users 104 that are located within the surrounding environment of the vehicle 102. As discussed below, the V2I message(s) provided by the RSE 106 may be analyzed to determine one or more V2X classifications that are associated with one or more of the respective road user(s) 104 that are identified as being located within the surrounding environment of the vehicle 102.

In one embodiment, the environment 100 may additionally include an externally hosted server infrastructure 114. As discussed in more detail below, the externally hosted server infrastructure 114 may host a neural network 116 that may be accessed by the vehicle 102, the road user(s) 104, and/or the RSE 106 to provide and/or obtain data. In some configurations, in addition to being hosted on the externally hosted server infrastructure 114, the neural network 116 or specific subsets (not shown) of the neural network 116 may also be hosted and/or executed by the vehicle 102, on the portable device(s) used by the drivers of the target vehicle(s) 108 and/or the portable device(s) 138 used by the NVRU(s) 110. In one or more embodiments, the externally hosted server infrastructure 114 may host one or more machine learning processors that may execute various types of machine learning methods. It is to be appreciated that this disclosure may apply to the training of the one or more machine learning processors and the various types of machine learning methods. However, for purposes of simplicity, this disclosure is focused on the utilization and training of the neural network 116.

In an exemplary embodiment, the neural network 116 may process a programming model which enables computer based learning that is based on one or more forms of data that are provided to the neural network 116 and/or learned by the neural network 116. The neural network 116 may be trained to provide one or more sensor classifications of the one or more road users 104 that are identified as being located within the surrounding environment of the vehicle 102 based on sensor data with respect to the road user(s) 104 that are located within the surrounding environment of the vehicle 102. As discussed in greater detail below, the neural network 116 may be trained to supplement a variance if one is found between the sensor classification(s) of the road user(s) conducted by the neural network and the V2X classification(s) that are determined based on V2X communications of the road user(s) 104 and/or the RSE 106 to the vehicle 102. More specifically, the V2X classification(s) may be determined based on communications between target vehicle(s) 108, the portable device(s) 138 used by the NVRU(s) 110, and/or the RSE 106 and the vehicle 102.

In one embodiment, the sensor classification(s) and the V2X classification(s) of the one or more road user(s) 104 may include categorization details associated with the road user(s) 104 that may include, but may not be limited to vehicle types (car, truck, bus, particular type of car, truck bus), type of NVRU (walking pedestrian, bicyclist)) associated with the target vehicle(s) 108 and/or the NVRU(s) 110 located within the surrounding environment of the vehicle 102. The sensor classification(s) and the V2X classification(s) may additionally include traveling details associated with the road user(s) 104 that may include, but may not be limited to, speed, turning status, braking status, driver and/or NVRU 110 biometric related details, weather conditions affecting travel, road conditions affecting travel, active use of the portable device(s) by the driver(s) of the target vehicle(s) 108, active use of the portable device(s) 138 by the NVRU(s), etc. associated with the target vehicle(s) 108 and/or the NVRU(s) 110 located within the surrounding environment of the vehicle 102. In some embodiments, the V2X classification(s) may additionally include additional details that may be provided as profile data that may include subjective details associated with the road user(s) 104 that may include, but may not be limited to, an expected traveling schedule (bus schedule), number of doorways, number of seats on-board, number of passengers on board, emergency status of the vehicle (police, fire, ambulance), pre-programmed running path of the NVRU(s) 110, age of the NVRU 110, traveling habits of the target vehicle(s) 108 and/or the NVRU 110, etc.

With particular reference to the vehicle 102, the vehicle 102 may include a vehicle computing device 118 (VCD) with provisions for processing, communicating and interacting with various components of the vehicle 102 and other components of the environment 100. In one embodiment, the VCD 118 may be implemented on an electronic control unit (not shown), among other components of the vehicle 102. Generally, the VCD 118 includes a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the VCD 118 and other components, networks, and data sources, of the environment 100.

The VCD 118 may also be operably connected for computer communication (e.g., via the bus and/or the I/O interface) to a head unit 120. The head unit 120 may include internal processing memory, an interface circuit, and bus lines (components of the head unit not shown) for transferring data, sending commands, and communicating with the components of the vehicle 102 directly and/or through the VCD 118. In one or more embodiments, the head unit 120 may execute one or more operating systems, applications, and/or interfaces that are associated with the vehicle 102.

In some embodiments, the head unit 120 may be connected to one or more respective display devices (not shown) (e.g., display screens), respective audio devices (not shown) (e.g., audio system, speakers), respective haptic devices (not shown) (e.g., haptic steering wheel), etc. that that may be operably controlled to provide a human machine interface (HMI) (not shown) to provide a driver of the vehicle 102 with various types of information that may include, but not limited to, the sensor classifications of one or more road users located within the surrounding environment of the vehicle 102, warnings/alerts associated with the sensor classifications of the one or more road users 104 located within the surrounding environment of the vehicle 102, and/or interfaces associated with the sensor classifications of the one or more road users 104 located within the surrounding environment of the vehicle 102.

In one or more embodiments, the head unit 120 may be operably connected to a storage unit 122. The storage unit 122 may store one or more operating systems, applications, associated operating system data, application data, vehicle system and subsystem user interface data, and the like that are executed by the VCD 118 and/or the head unit 120. As will be discussed in more detail below, in an exemplary embodiment, the storage unit 122 of the vehicle 102 may be utilized to store sensor classification(s) based on analysis conducted by the neural network 116. In one or more embodiments, the storage unit 122 may store the neural network 116, a subset of the neural network 116, or a subset of data that is utilized by the neural network 116. Additionally, as discussed below, the storage unit 122 may be accessed to store one or more sensor classifications of the road user(s) 104 and/or one or more null messages and corresponding data flags that are associated with a command to train the neural network 116 that is stored upon determining that a sensor classification(s) may not be determined by the neural network 116 for a particular road user(s) 104.

The vehicle 102 may additionally include vehicle sensors 124 that may sense and provide sensor data that is used by the application 200 to determine the sensor classification(s) of the road user(s) 104. In one or more embodiments, the vehicle sensors 124 may include, but are not limited to, sensors associated with vehicle systems 126 and other sensors associated with the vehicle 102 to sense the road user(s) 104 and/or environmental conditions (weather conditions, traffic conditions, and/or road conditions) associated with the road user(s) 104. Specific vehicle sensors (not shown) configured to sense the road user(s) 104 may be mounted within one or more internal and/or external portions of the vehicle 102. In particular, the specific vehicle sensors may be configured to sense a 360 degree field around the vehicle 102 that may include the surrounding environment of the vehicle 102.

In one embodiment, the vehicle sensors 124 may include one or more cameras that may include, but are not limited to, infrared cameras, digital cameras, stereo cameras, video cameras. In some embodiments, the one or more cameras may be configured to capture and provide one or more stereoscopic images/video of the surrounding environment of the vehicle 102. The vehicle sensors 124 may additionally include, but may not be limited to, RADAR/LIDAR sensors, laser sensors, acoustic sensors, light sensors, proximity sensors, thermal sensors, and temperature sensors.

In some embodiments, the vehicle sensors 124 may additionally include vehicle dynamics sensors (not shown) that may utilized to provide vehicle dynamic data to one or more components of the vehicle 102 and to the road user(s) 104 that is communicated via the V2X communications protocol. The vehicle dynamics sensors may include, but are not limited to, vehicle speed sensors, vehicle acceleration sensors, vehicle angular velocity sensors, accelerator pedal sensors, brake sensors, steering wheel angle sensors, vehicle locational sensors (e.g., GNSS coordinates), vehicle directional sensors (e.g., vehicle compass), throttle position sensors, respective wheel sensors, anti-lock brake sensors, camshaft sensors, among other sensors.

As discussed in more detail below, in one or more embodiments, the vehicle sensors 124 may provide sensor data that may include data relating to the sensing of at least one object that may include the road user(s) 104 within the surrounding environment of the vehicle 102. The sensor data is provided to be analyzed using the neural network 116 to provide the sensor classification(s) of the road user(s) 104 (sensed by the vehicle sensors 124). As will be discussed, the sensor classification(s) will be further compared to V2X classification(s) of the respective road user(s) 104 to determine if the neural network 116 is to be trained to more accurately classify the road user(s) when evaluating the sensor data provided by the vehicle sensors 124 to provide the sensor classification(s) of the road user(s) 104 (subsequent to the training of the neural network 116).

In one or more embodiments, the vehicle 102 may additionally include vehicle systems 126 that may utilize the vehicle sensors 124 to provide sensor data that is applied to provide one or more features/functions with respect to the vehicle 102. It is understood that the vehicle systems 126 (specific vehicle systems not shown) may include, but are not limited to, systems associated to the vehicle sensors 124. In some embodiments, the vehicle systems 126 may augment sensor data provided by the vehicle sensors 124 with data that is specifically provided by one or more particular vehicle systems 126. For example, the sensor data may be augmented with one or more collision risk warnings, one or more road ice warnings, one or more biometric related warnings (driver tiredness) etc., that may be presented through the head unit 120 that are associated to one or more sensed road user(s) 104 and/or environmental conditions associated with the road user(s) 104.

In an exemplary embodiment, the vehicle 102 additionally includes a vehicle communication system 128. The vehicle communication system 128 may include a V2X transceiver (not shown) that may be capable of communication through one or more V2X communications protocols on the vehicle communications network. More particularly, the vehicle communication system 128 may be capable of implementing V2X, V2I, and V2V communications through the vehicle communications network. Although not shown in FIG. 1, the vehicle communication network may include other wireless communication networks, receivers, servers, and/or providers that may be accessed by the vehicle 102, the road users 104 and/or the RSE 106. Accordingly, the vehicle communication system 128 may additionally be capable of providing wired or wireless computer communications utilizing various protocols to send/receive non-transitory signals internally to the plurality of components of the vehicle 102 and/or externally to external devices including the road user(s) 104 and/or the RSE 106. Generally, these protocols include a wireless system (e.g., IEEE 802.11 (WiFi), IEEE 802.15.1 (Bluetooth®)), a near field communication system (NFC) (e.g., ISO 13157), a local area network (LAN), and/or a point-to-point system.

In an exemplary embodiment, the vehicle communication system 128 may be configured to communicate through one or more V2X communications protocols on the vehicle communications network to the one or more road users 104. More specifically, the vehicle communication system 128 may communicate through one or more V2X communications protocols by sending and/or receiving one or more V2V messages with a vehicle communication system 128 operably connected to the target vehicle(s) 108. The vehicle communication system 128 may also communicate through one or more V2X communications protocols by sending and/or receiving one or more V2X messages with a device communication system 146 of the portable device(s) 138 used by the NVRU(s) 110. The vehicle communication system 128 may additionally be configured to communicate through one or more V2X communications protocols by sending and/or receiving one or more V2I messages with a device communication system 154 operably connected to the RSE 106.

As discussed in more detail below, the vehicle communication system 128 of the vehicle 102 may receive one or more V2X communications in the form of one or more V2V messages and/or V2X messages from the one or more road users 104, and/or one or more V2I messages from the RSE 106 located within the surrounding environment of the vehicle 102. The V2X communications received by the vehicle communication system 128 may include the V2V message(s) and/or V2X message(s) that are sent from the road user(s) 104 that may include sensor data and/or profile data associated with the (respective) road user(s) 104. Additionally, the V2X communications received by the vehicle communication system 128 may include (birds-eye) information associated with the road user(s) 104 that is collected by the RSE(s) 106 and sent from the RSE(s) 106 through the device communication system 154 to the vehicle 102 to be further analyzed.

With particular reference to the road user(s) 104, as discussed above, the road user(s) 104 may include the target vehicle(s) 108 and the NVRU(s) 110. In one embodiment, the target vehicle(s) 108 may include a vehicle computing device 130 (VCD) with provisions for processing, communicating and interacting with various components of the target vehicle(s) 108 and other components of the environment 100. In one embodiment, the VCD 118 may be implemented on an electronic control unit (not shown), among other components of the target vehicle(s) 108. Generally, the VCD 130 includes a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the VCD 130 and other components, networks, and data sources, of the environment 100.

In one or more embodiments, the VCD 130 may be operably connected to a storage unit 132. The storage unit 132 may be included as a stand-alone component of the target vehicle(s) 108. In one embodiment, the storage unit 132 may store profile data associated with the target vehicle(s) 108. The profile data may include object categorization information (e.g., type/model of target vehicle(s)), road user attribute information that described attributes of the road user(s) (e.g., dimensions of the target vehicle(s) 108), and subjective data related to the target vehicle(s) 108 (e.g., bus schedules, number of seats, various lighting configurations, various alerts provided by various components of the target vehicle(s) 108) that may be stored within the storage unit 132 via a manufacturer of the target vehicle(s) 108, an owner of the target vehicle(s) 108, and/or a third-party associated with the target vehicle(s) 108. For example, the profile may include categorization, attributes, and subjective data related to a particular bus (target vehicle(s) 108) that includes the make/model of the bus, a bus number associated with the bus, a particular route utilized by the bus, an average speed of the bus, number of planned stops by the bus, the number of seats included within the bus, the number of doorways included within the bus, the length of the bus, the width of the bus, lighting status of the bus, and the like).

In one embodiment, the storage unit 132 may include sensor data relating to the target vehicle(s) 108 that is provided and stored by vehicle sensors 134 of the target vehicle(s) 108. For example, the storage unit 132 may include vehicle dynamics data associated with the target vehicle(s) 108, such as the speed, heading, and direction of the target vehicle(s) 108. The vehicle sensors 134 may provide the sensed information to one or more components of the target vehicle(s) 108 that may be utilized by target vehicle(s) 108 and/or may be communicated to the vehicle 102 and/or the RSE 106 through one or more V2X communications protocols on the vehicle communications network, as discussed below. More particularly, the vehicle sensors 134 may provide categorization information, attribute information, dynamics information, and environmental information in the form of sensor data that may be communicated to the vehicle 102 and/or the RSE 106.

In one embodiment, the vehicle sensors 134 (individual vehicle sensors not shown) may include, but may not be limited to, vehicle dynamics sensors, vehicle imaging sensors, vehicle RADAR/LIDAR sensors, vehicle laser sensors, vehicle seat sensors, vehicle door sensors, and the like. In one embodiment, the vehicle dynamics sensors may include sensors similar to the vehicle dynamics sensors of the vehicle 102, described above. The vehicle dynamics sensors may provide vehicle dynamics information associated with the target vehicle(s) 108 in the form of the sensor data that may be stored on the storage unit 132 and/or communicated by a vehicle communication system 136 of the target vehicle(s) 108 to the vehicle 102 and/or the RSE 106 through one or more V2X communications protocols on the vehicle communications network.

Additionally the vehicle sensors 134 of the target vehicle(s) 108 may sense and provide sensor data with respect to one or more attributes of the target vehicle(s) 108 and/or the surrounding environment of the target vehicle(s) 108. For example, the vehicle sensors 134 may provide one or more attributes relating to the number of seated passengers that may be sensed within the target vehicle(s) 108, environmental conditions (e.g., weather conditions, traffic conditions, road conditions) that may be impacting travel of the target vehicle(s) 108, and/or one or more objects external to the target vehicle(s) 108 that are sensed by the vehicle sensors 134 of the target vehicle(s) 108. In one embodiment, the vehicle sensors 134 may provide sensor data to the VCD 118 to be further communicated to the components of the target vehicle(s) 108, to additional target vehicles (not shown), the vehicle 102, and/or the RSE 106 through one or more V2X communications protocols on the vehicle communications network.

The vehicle communication system 136 of the target vehicle(s) 108 may be configured to communicate using the V2X communications protocol(s) through the vehicle communications network to one or more additional target vehicles (not shown), the portable device(s) 138 used by the NVRU(s) 110, the vehicle 102, and/or the RSE 106. The vehicle communication system 128 may additionally be capable of providing wired or wireless computer communications utilizing various protocols to send/receive non-transitory signals internally to the plurality of components of the target vehicle(s) 108 and/or externally to external devices including the vehicle 102, the RSE 106, and/or one or more additional target vehicles, and/or the portable device(s) 138. Generally, these protocols include a wireless system (e.g., IEEE 802.11 (WiFi), IEEE 802.15.1 (Bluetooth®)), a near field communication system (NFC) (e.g., ISO 13157), a local area network (LAN), and/or a point-to-point system.

In an exemplary embodiment, the vehicle communication system 136 may communicate through the vehicle communications network with the vehicle communication system 128 of the vehicle 102 to communicate the V2V message(s) directly to the vehicle 102. Additionally, the vehicle communication system 136 may communicate through the vehicle communications network with the device communication system 974 of the RSE 106 to communicate the V2I message(s) directly to the RSE 106. More specifically, the VCD 130 may access the profile and/or the sensor data stored on the storage unit 132 and/or the VCD 118 may be provided with the sensor data directly from the vehicle sensors 134. The VCD 130 may utilize the vehicle communication system 136 to communicate profile data and/or the sensor data that may be contained within the V2V message(s) to the vehicle 102 via the V2V communication protocol and/or the V2I message(s) to the RSE 106 via the V2I communication protocol. For example, the VCD 130 may utilize the vehicle communication system 128 to continually communicate profile data and sensor data via the sending of one or more V2V messages with the vehicle 102 and/or the sending of one or more V2I messages with the RSE(s) 106 located within the surrounding environment of the target vehicle(s) 108. In some embodiments, the VCD 130 may utilize the vehicle communication system 136 to communicate profile data and/or the sensor data to one or more additional target vehicles via one or more V2V messages and/or the portable device(s) 138 used by the NVRU(s) 110 via one or more V2X messages.

In an exemplary embodiment, the data contained within the V2V messages may include the profile data and sensor data, that includes, but may not be limited to, object categorization information (e.g., type of target vehicle(s) 108 (car, bus, truck), make/model of target vehicle(s) 108), road user attribute information (e.g., dimensions of target vehicle(s) 108), dynamics information (e.g., speed, direction, heading of the target vehicle(s) 108), environmental information (e.g., vehicle lighting, usage of sirens, horn, weather, traffic, road conditions affecting the travel of the target vehicle(s) 108), and subjective information related to the target vehicle(s) 108 (e.g., number of seats, various lighting configurations, stored GPS destinations) provided by the target vehicle(s) 108) that are associated with the target vehicle(s) 108.

With particular reference to the portable device(s) 138, the portable device(s) 138 may be used by the NVRU(s) 104b (e.g., may be in possession of the NVRU(s) 110, may be worn by the NVRU(s) 110, may be associated with the NVRU(s) 110) and may include, but may not be limited to, a hand-held device, a mobile-device, a wearable-device, a smart phone, a laptop, a tablet, and the like. The portable device(s) 138 may include a control unit 140 that may process and compute functions associated with the components of the portable device(s) 138.

In one embodiment, the control unit 140 may be operably connected to a storage unit 142 of the portable device(s) 138 that may store a profile associated with the NVRU(s) 110. The profile may include categorization information (e.g., type of NVRU 110, walking pedestrian, running pedestrian), attribute information (e.g., height/weight of NVRU 110) and subjective information (e.g., pre-programmed traveling paths) related to the NVRU(s) 110 that may be stored on the storage unit 142 by the NVRU(s) 110 and/or one or more third party applications (not shown) that are executed on the portable device(s) 138 (e.g., fitness applications that store physical parameter profiles associated with the NVRU(s) 110). For example, the profile may include a categorization and attributes related to a bicyclist that may be associated with a specific route utilized by the bicyclist, a physical profile of the bicyclist, and a physical profile of a bike used by the bicyclist.

In one embodiment, the storage unit 142 may also be used to store sensed information associated with the NVRU(s) 110 that is provided by device sensors 144 of the portable device(s) 138. The device sensors 144 of the portable device(s) 138 may be configured to sense and output categorization information (e.g., slow paced walker, fast paced walker, runner, and bicyclist), attribute information (e.g., physical profile of pedestrian), dynamics information (e.g., speed, direction, heading information of a bicyclist), and environmental information (e.g., biometric data of a runner) in the form of sensor data that may be communicated to the vehicle 102 and/or the RSE 106. In some embodiments, the sensor data may additionally be communicated to the target vehicle(s) 108 located within a surrounding environment of the NVRU(s) 110 using the portable device(s) 138.

In one embodiment, the portable device(s) 138 may include device sensors 144. The device sensors 144 may include, but may not be limited to, an accelerometer, a magnetometer, a gyroscope, an ambient light sensor, a proximity sensor, a locational sensor (e.g., GPS), a positional sensor, a directional sensor (e.g., compass), and the like. Additionally, the device sensors 144 may include one or more cameras (not shown) that may be accessed by the one or more applications executed and/or accessed on the portable device(s) 138. The device sensors 144 may sense one or more physical movement parameters that are associated with the NVRU(s) 110 and may provide the sensed physical movement parameters as sensor data that may be used to classify the NVRU(s) 110 by the application 200.

A device communication system 146 of the portable device(s) 138 may be configured to communicate via the vehicle communications network to the vehicle 102, the RSE 106 and/or the target vehicle(s) 108. In particular, the device communication system 146 may be capable of providing V2X communications through the vehicle communications network. The device communication system 146 may additionally be capable of providing wired or wireless computer communications utilizing various protocols to send/receive non-transitory signals internally to the plurality of components of the portable device(s) 138 and/or externally to external devices including the vehicle 102, the target vehicle(s) 108, additional portable devices (not shown), and/or the RSE 106. Generally, these protocols include a wireless system (e.g., IEEE 802.11 (WiFi), IEEE 802.15.1 (Bluetooth®)), a near field communication system (NFC) (e.g., ISO 13157), a local area network (LAN), and/or a point-to-point system.

In one or more embodiments, the control unit 140 may access the profile and/or the sensor data stored on the storage unit 142 and/or the control unit 140 may be provided with the sensor data from the device sensors 144. The control unit 140 may utilize the device communication system 146 to communicate the profile data and/or the sensor data as included within one or more V2X messages that are communicated to the vehicle 102 via the V2X communication protocol. More specifically, the control unit 140 may operably control the device communication system 146 to continually communicate the profile data and/or the sensor data that is included within one or more V2X messages to the vehicle communication system 128 of the vehicle 102 located within the surrounding environment of the NVRU(s) 110 using the portable device(s) 138. In some embodiments, the control unit 140 may also operably control the device communication system 146 to continually communicate the one or more V2X messages to the target vehicle(s) 108 and/or the RSE 106 located within the surrounding environment of the NVRU(s) 110 using the portable device(s) 138.

In particular, the V2X message(s) may include the categorization information, attribute information, dynamics information, environmental information, and subjective information associated with the NVRU(s) 110. As discussed below, upon receipt of the V2X messages by the vehicle communication system 128, the V2X messages may be further evaluated to provide the V2X classification(s) of the NVRU(s) 110. As discussed below, the V2X classification(s) of the NVRU(s) 110 may be compared against the sensor classification(s) of the NVRU(s) 110 determined by the neural network 116 based on sensor data that pertains to the NVRU(s) 110 (as provided by the device sensors 144 of the portable device(s) 138). In one embodiment, if the comparison of the V2X classification(s) of the NVRU(s) 110 with the sensor classification(s) determined by the neural network 116 yields a variance, the neural network 116 may be accordingly trained based on the V2X classification(s) and information contained within the V2X message(s) received by the vehicle 102 from the portable device(s) 138.

With particular reference to the RSE 106 operably connected to the roadway infrastructure 112, the RSE 106 may include a control unit 148 that may process and compute functions associated with the components of the RSE 106. The control unit 148 may be operably connected to a storage unit 150. In one embodiment, the storage unit 150 may store a profile associated with the surrounding environment of the RSE 106 (e.g., within a proximity of the RSE 106) that contains infrastructure related data. The infrastructure related data contained within the profile may include, but may not be limited to, details regarding roadways and physical infrastructure located at an intersection, on/off ramp, roadway, map data, satellite imagery, etc.

In one embodiment, the device sensors 152 of the RSE 106 may provide categorization information, attribute information, dynamics information, and environmental information associated with one or more forms of sensor data that may be associated to the road user(s) 104 that are located within the surrounding environment of the RSE 106. In particular, the device sensors 152 of the RSE 106 may include image sensors (e.g., cameras) that may be positioned and configured to capture a birds-eye/overhead view of the surrounding environment of the RSE 106. In particular, the device sensors 152 may include control logic that is designed to determine and provide categorization information, attribute information, dynamics information, and environmental information associated with the target vehicle(s) 108 and/or the NVRU(s) 110 that are captured (e.g., from an overhead viewpoint) within the surrounding environment of the RSE 106. The device sensors 152 may be additionally configured to output sensor data that may be stored on the storage unit 150. In one embodiment, the device sensors 152 may output the sensor data to the control unit 140 and/or may store the sensor data on the storage unit 150 to be accessed by the control unit 140 and communicated to the vehicle 102 through a device communication system 154 of the RSE 106.

In one embodiment, the device communication system 154 of RSE 106 may be configured to communicate via the vehicle communications network to the vehicle 102, the target vehicle(s) 108, the portable device(s) 138, and additional RSEs (not shown) located within a predetermined vicinity of the RSE 106. The device communication system 154 may be configured to provide wired or wireless computer communications utilizing various protocols to send/receive non-transitory signals internally to the plurality of components of the RSE 106 and/or externally to external devices including the vehicle 102 and/or one or more of the road users 104. Generally, these protocols include a wireless system (e.g., IEEE 802.11 (WiFi), IEEE 802.15.1 (Bluetooth®)), a near field communication system (NFC) (e.g., ISO 13157), a local area network (LAN), and/or a point-to-point system capable of providing V2X, V2I, and V2V communications through the vehicle communications network. The device communication system 154 may additionally be capable of providing wired or wireless computer communications utilizing various protocols to send/receive non-transitory signals internally to the plurality of components of the RSE 106 and/or externally to external devices including the road user(s) 104 and/or the vehicle 102. Generally, these protocols include a wireless system (e.g., IEEE 802.11 (WiFi), IEEE 802.15.1 (Bluetooth®)), a near field communication system (NFC) (e.g., ISO 13157), a local area network (LAN), and/or a point-to-point system.

In one or more embodiments, the control unit 148 may access the storage unit 150 to retrieve the sensor data stored by the device sensors 152 and/or the control unit 148 may be provided with the sensor data from the device sensors 152. The control unit 148 may utilize the device communication system 154 to communicate the sensor data to the vehicle 102 via the V2I communication protocol. More specifically, the control unit 148 may operably control the device communication system 154 to continually communicate the one or more V2I messages to the vehicle communication system 128 of the vehicle 102 located within the surrounding environment of the RSE 106. In some embodiments, the control unit 140 may operably control the device communication system 154 to continually communicate the one or more V2I messages to the target vehicle(s) 108 located within the surrounding environment of the RSE 106.

With reference to V2I message(s) communicated by the RSE(s) 106 to the vehicle 102, in one or more embodiments, the V2I message(s) sent from the RSE(s) 106 to the vehicle 102 may include the sensor data that includes categorization information, attribute information, dynamics information, and environmental information associated with the one or more road users 104 (the target vehicle(s) 108 and/or the NVRU(s) 110) sensed by the device sensors 152 within the surrounding environment of the RSE 106. In one embodiment, upon receipt of the V2I message(s) by the vehicle communication system 128 of the vehicle 102, the V2I message(s) may be evaluated to provide the V2X classification(s) of the target vehicle(s) 108 and/or the NVRU(s) 110. As discussed below, the V2X classification(s) of the road user(s) 104 may be compared against the sensor classification(s) of the road user(s) 104 determined by the neural network 116. In one embodiment, if the comparison of the V2X classification(s) of the road user(s) 104 with the sensor classification(s) of the road user(s) 104 determined by the neural network 116 yields a variance, the neural network 116 may be accordingly trained based on the V2X classification(s) and information contained within the V2I message(s) received by the vehicle 102 from the RSE 106.

With particular reference to the neural network 116 hosted on the externally hosted server infrastructure 114 and/or the storage unit 122 of the vehicle 102, the neural network 116 may include a neural network processing unit 156 and a neural network machine learning database 158. In one embodiment, the neural network processing unit 156 may be configured to utilize one or more types of machine learning methods and/or deep learning methods to provide artificial intelligence capabilities that may be utilized to build and maintain the neural network machine learning database 158 with various types of data. The neural network processing unit 156 may process information that is provided as inputs and may utilize the neural network machine learning database 158 to access stored machine learned data to provide various functions, that may include, but may not be limited to, object classification, feature recognition, computer vision, speed recognition, machine translation, autonomous driving commands, and the like.

In an exemplary embodiment, the neural network machine learning database 158 may store sensor classification data (not shown) that may be accessed and analyzed to determine the sensor classification of the one or more road users 104 including the target vehicle(s) 108 and/or the NVRU(s) 110 that are sensed by the vehicle sensors 124 of the vehicle 102. In particular, upon receiving the sensor data, the VCD 118 of the vehicle 102 may communicate the sensor data to the neural network processing unit 156 to access sensor classification data from the neural network machine learning database 158. Upon communication with the neural network 116, the sensor classification of the road user(s) 104 sensed by the vehicle sensors 124 may be determined based on the sensor data output by the vehicle sensors 124 and the associated classification data provided by the neural network machine learning database 158.

As described in detail below, in an exemplary embodiment, V2X data points (data points) may be processed from the one or more V2V messages sent by the target vehicle(s) 108, V2X messages sent by the portable device(s) 138 used by the NVRU(s) 110, and/or V2I messages sent by the RSE 106 received by the vehicle communication system 128 of the vehicle 102. One or more of the aforementioned messages may be processed into the data points that may be extracted to determine the one or more V2X classifications that are associated with the one or more respective road users 104 that are located within the surrounding environment of the vehicle 102. In additional embodiments, the V2X classification(s) may be determined for additional types of physical objects (e.g., physical infrastructure, buildings, landmarks, etc.) that may be located within the surrounding environment of the vehicle 102 and may be provided to supplement sensor based data (sensor data) provided by the vehicle 102.

In an exemplary embodiment, the neural network processing unit 156 may be accessed to train the neural network 116 if it is determined that there is a variance between the sensor classification(s) of the road user(s) 104 sensed by the vehicle sensors 124 (as provided based on the sensor data from the neural network machine learning database 158) and the V2X classification(s) of the road user(s) 104 as determined based on V2V message(s), V2X message(s), and/or V2I message(s) received from the target vehicle 108, the portable device(s) 138, and/or the RSE 106. As discussed below, classification variance data may be determined that includes one or more data points from the V2X classification(s) that supplements the variance between the V2X classification(s) and the sensor classification(s) if one is found. Upon determining the classification variance data, the neural network 116 may be trained by updating the neural network machine learning database 158 with the variance data to supplement the variance and to provide updated neural network data that may be used to more accurately classify the road user(s) 104 when the analysis of sensor data provided by the vehicle sensors 124 occurs (subsequent to the training of the neural network 116).

II. Road User Classification Training Application

Figure 2:
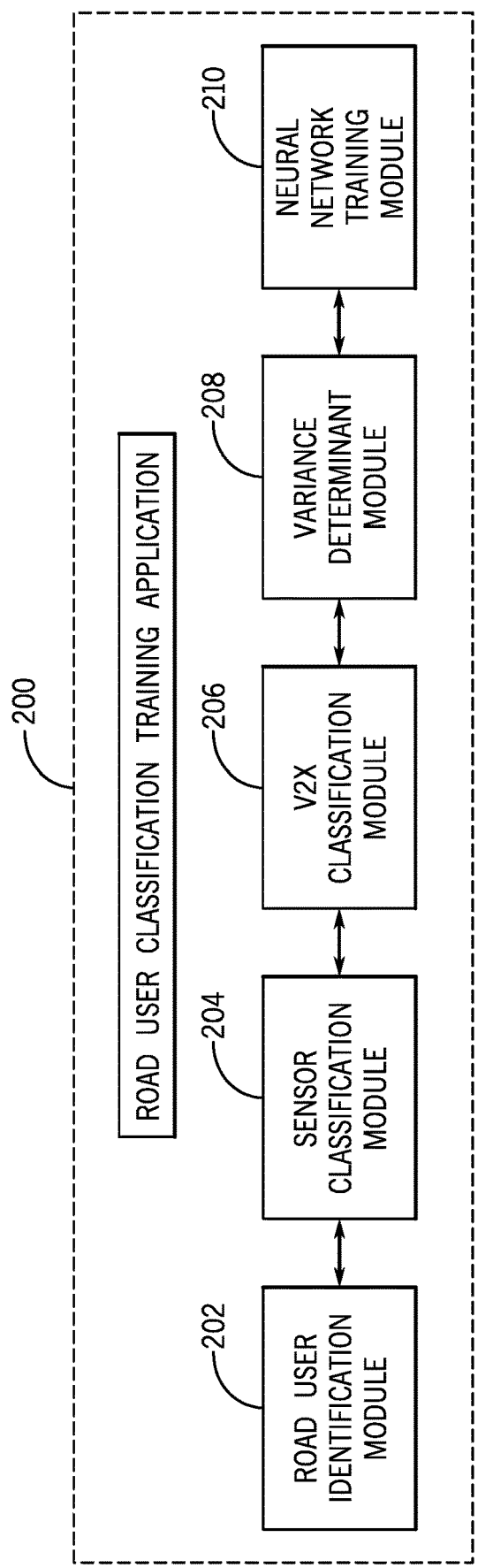
FIG. 2 is a schematic view of a road user classification training application according to an exemplary embodiment.

FIG. 2 is a schematic view of a road user classification training application 200 according to an exemplary embodiment. As discussed in more detail below, the road user classification training application 200 may be utilized to train the neural network 116 with classification variance data that pertains to the road user(s) 104 sensed by the vehicle sensors 124 of the vehicle 102. The road user classification training application 200 may receive sensor data provided by the vehicle sensors 124 and may utilize the neural network 116 (machine learning) to provide the sensor classification(s) of the road user(s) 104. The application 200 may additionally evaluate V2V message(s), V2X message(s) and/or V2I message(s) received by the vehicle communication system 128 of the vehicle 102 from the target vehicle(s) 108, the portable device(s) 138 used by the NVRU(s) 110, and/or the RSE 106 to determine the V2X classification(s) of the road user(s) 104. The application 200 additionally determines if a variance exists between the V2X classification(s) and the sensor classification(s) of the road user(s) 104 and may train the neural network 116 with classification variance data that may include one or more data points from the V2X classification(s) to provide updated neural network data that may be used to more accurately classify the road user(s) 104.

In an exemplary embodiment, the road user classification training application 200 may be stored on one or more of the storage units 122, 132, 142, 150 and executed by the VCD 118 of the vehicle 102, the VCD 130 of the target vehicle(s) 108, the control unit 140 of the portable device(s) 138 used by the NVRU(s) 110, and/or the control unit 148 of the RSE 106. In another embodiment, the road user classification training application 200 may be stored on the externally hosted server infrastructure 114 and may be accessed by the vehicle 102, the target vehicle(s) 108, the portable device(s) 138 used by the NVRU(s) 110, and/or the RSE 106.

In an exemplary embodiment, the road user classification training application 200 may include a road user identification module 202, a sensor classification module 204, a V2X classification module 206, a variance determinant module 208, and a neural network training module 210. In one embodiment, the road user identification module 202 of the application 200 may be utilized to identify the existence of the road user(s) 104 located within the surrounding environment of the vehicle 102. More specifically, the road user identification module 202 may communicate with the vehicle sensors 124 of the vehicle 102 and/or the vehicle communication system 128 of the vehicle 102 to identify which if any road user(s) 104 are located within the surrounding environment of the vehicle 102. If the road user identification module 202 identifies one or more target vehicles 108 and/or one or more NVRUs 110 located within the surrounding environment of the vehicle 102, the road user identification module 202 may communicate respective data to the sensor classification module 204.

The sensor classification module 204 of the application 200 may communicate with the vehicle sensors 124 of the vehicle 102 to obtain sensor data associated with the sensing of the road user(s) 104 identified as being located within the surrounding environment of the vehicle 102. In one embodiment, upon obtaining the sensor data from the vehicle sensors 124, the sensor classification module 204 may communicate the sensor data to the neural network 116 to determine the sensor classification of the target vehicle(s) 108 and/or the NVRU(s) 110 identified as being located within the surrounding environment of the vehicle 102. As discussed below, the neural network 116 may be utilized by the sensor classification module 204 to provide the sensor classification(s) of the road user(s) 104 identified (by the road user identification module 202) as being located by the road user identification module 202. Upon providing the sensor classification(s) of the road user(s) 104, the sensor classification module 204 may store the sensor classifications(s) of the road user(s) 104 on the storage unit 122 of the vehicle 102 to be further accessed by the application 200 and/or additional components of the vehicle 102. In some embodiments, the sensor classification module 204 may directly communicate the sensor classification(s) to the variance determinant module 208.

In an exemplary embodiment, the V2X classification module 206 may communicate with the vehicle communication system 128 to obtain the V2V message(s), V2X message(s), and/or the V2I message(s) that are received by the vehicle communication system 128 from the road user(s) 104 and/or the RSE 106. Upon receiving the aforementioned messages from the road user(s) 104 and/or the RSE 106, the vehicle communication system 128 may provide the V2V message(s), V2X message(s), and/or the V2I message(s) to the V2X classification module 206. In one embodiment, the V2X classification module 206 may analyze the message(s) to extract one or more data points that are indicative of the sensor data and/or the profile data included within the message(s) to determine a V2X classification(s) of the road user(s) 104 identified as being located within the surrounding environment of the vehicle 102. Upon determining the V2X classification(s) of the road user(s) 104, the V2X classification module 206 may store the V2X classification(s) of the road user(s) 104 on the storage unit 122 of the vehicle 102 to be further accessed by the application 200 and/or additional components of the vehicle 102. In some embodiments, the V2X classification module 206 may directly communicate the V2X classification(s) to the variance determinant module 208.

The variance determinant module 208 of the road user classification training application 200 may be utilized to compare the V2X classification(s) of the road user(s) 104 (as determined by the V2X classification module 206) and the sensor classification(s) of the road user(s) 104 (as determined by the sensor classification module 204). More specifically, the variance determinant module 208 may compare the data point(s) included within the V2X classification(s) of the road user(s) 104 with one or more data points extracted from the sensor classification(s) of the road user(s) 104 to determine if a variance (e.g., difference in data included within the V2X classification(s) and sensor classification(s)) exists between the V2X classification(s) of the road user(s) 104 and the sensor classification(s) of the road user(s) 104. In particular, the data point(s) may include the categorization information, road user attribute information, dynamics information, and/or the environmental information associated with the road user(s) 104.

In one or more embodiments, upon comparing the data point(s) included within the V2X classification(s) of the road user(s) 104 and the sensor classification(s) of the road user(s) 104, if the variance determinant module 208 determines that the variance exists between the V2X classification(s) and the sensor classification(s), the variance determinant module 208 may provide classification variance data associated with the variance to the neural network training module 210. In one embodiment, the classification variance data may include one or more data points that are determined from the analysis of the V2X classification(s) of the road user(s) 104 that may not be included within the sensor classification(s) of the respective road user(s) 104, as provided by the neural network 116. In other words, the variance determinant module 208 may determine the classification variance data as data that includes categorization information, road user attribute information, dynamics information, and/or the environmental information associated with the road user(s) 104 as included within the V2X classification(s) of the road user(s) 104 that may supplement the variance that exists between the V2X classification(s) and the sensor classification(s) of the road user(s) 104 located within the surrounding environment of the vehicle(s) 102.

In one or more embodiments, the classification variance data may include data that not only supplements the variance that exists but also provides multiple points of data with respect to the categorization information, road user attribute information, dynamics information, and/or the environmental information that may be updated to the neural network 116. For example, the classification variance data may include a complete data set (e.g., large data set) associated with the categorization information, road user attribute information, dynamics information, and/or the environmental information associated with the road user(s) 104 as included within the V2X classification(s) of the road user(s) 104 that may supplement the variance that exists between the V2X classification(s) and the sensor classification(s) and add additional details associated with the road user(s) 104 to enhance the sensor classifications (e.g., based on new or updated data that may be already be included but may be added or updated to the neural network machine learning database 158).

Upon determining the classification variance data, the variance determinant module 208 may communicate the classification variance data to the neural network training module 210. In an exemplary embodiment, upon receipt of the classification variance data, the neural network training module 210 may communicate with the neural network processing unit 156 to provide the classification variance data to the neural network 116. In particular, the neural network training module 210 may communicate with the neural network processing unit 156 to train the neural network 116 with the classification variance data. As discussed below, the neural network training module 210 may communicate with the neural network processing unit 156 to train the neural network 116 by updating the neural network machine learning database 158 with the classification variance data that pertains to the target vehicle(s) 108 and/or the NVRU(s) 110 that are located within the surrounding environment of the vehicle 102.

As discussed, the neural network 116 is updated with the classification variance data to supplement the variance that exists between the V2X classification(s) and sensor classification(s) of the road user(s) 104 located within the surrounding environment of the vehicle 102. This functionality ensures that the neural network 116 is updated in real-time (e.g., without having to be pre-trained and/or updated offline) to more accurately classify similar types/categories of target vehicle(s) 108 and/or NVRU(s) 110 located within the surrounding environment of the vehicle 102 based on the sensor data that is provided by the vehicle sensors 124 of the vehicle 102 upon identifying road user(s) 104 that exist within the surrounding environment of the vehicle 102. Consequently, when the neural network 116 is utilized to determine the sensor classification(s) of the particular types/categories of the target vehicle(s) 108 and/or the NVRU(s) 110 (subsequent to the training of the neural network 116), the neural network 116 may more provide more accurate sensor classification(s) of the target vehicle(s) 108 and/or the NVRU(s) 110 based on sensor data that is provided by the vehicle sensors 124 of the vehicle 102.

As discussed below, in some embodiments, the neural network training module 210 may alternately train the neural network 116 with the V2X classification(s) determined by the V2X classification module 206 when the type/categories of road user(s) 104 is unknown to the neural network 116. In particular, the neural network 116 may be trained with the V2X classification(s) in such circumstances when the neural network machine learning database 158 may not include data associated with the sensor classification(s) of types/categories of one or more of the target vehicles 108 and/or one or more of the NVRUs 110 that may include new vehicle models (e.g., first generation model of a new vehicle type), new vehicle configurations (e.g. vehicles with updated dimensions, seating configurations, lighting configurations), new categories of NVRU(s) 110 (e.g., users using new types of mobility devices such as hover boards), and the like. In other words, if the neural network machine learning database 158 does not include data associated with the sensor classification(s) of types/categories of one or more of the target vehicles 108 and/or one or more of the NVRUs 110, the neural network training module 210 may update the neural network machine learning database 158 with new V2X classification(s) of these road user(s) 104.

III. Methods Related to the Road User Classification Training Application

Figure 3:
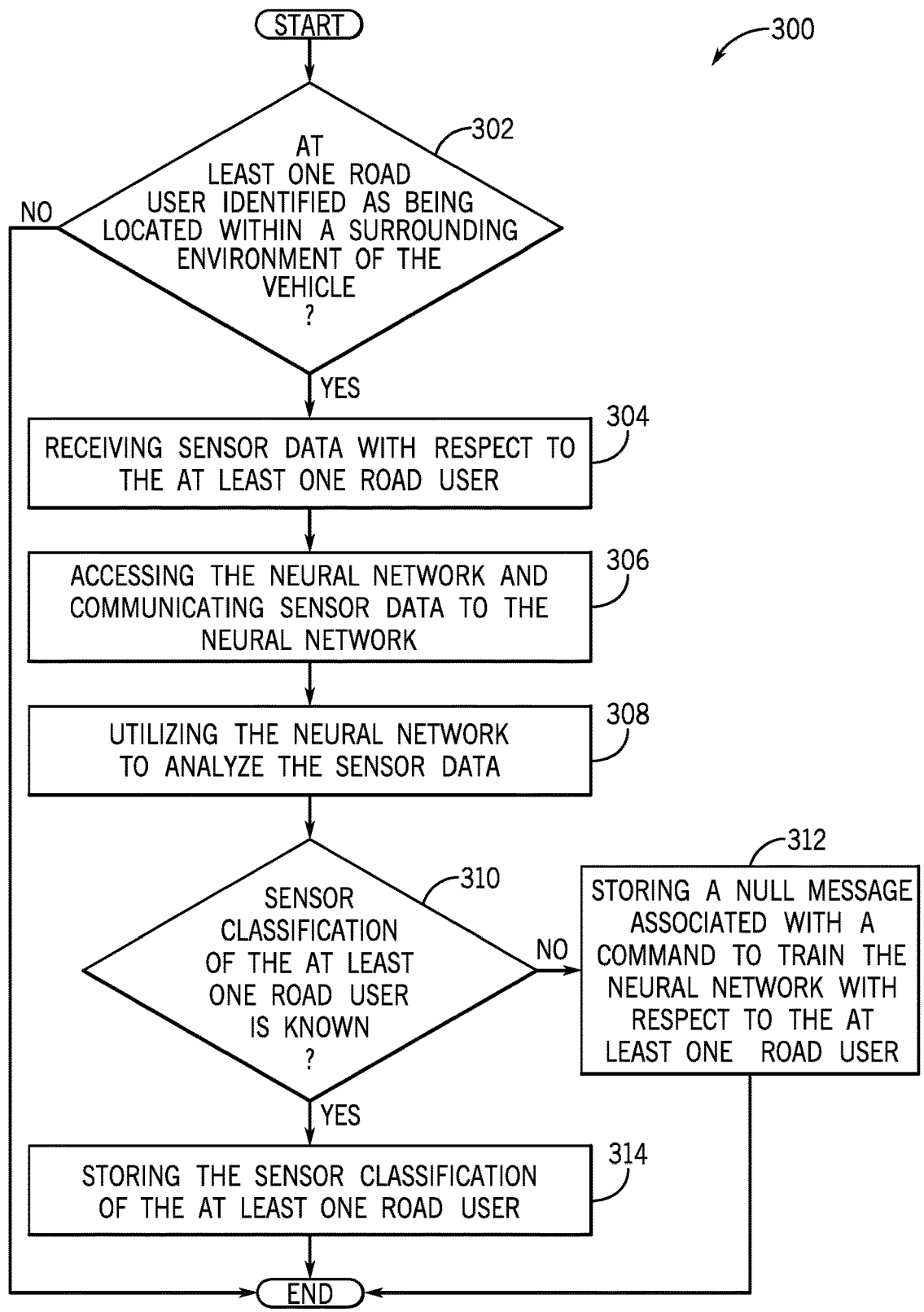
FIG. 3 is a process flow diagram of a method for determining a sensor classification of at least one road user located within the surrounding environment of a vehicle according to an exemplary embodiment.

FIG. 3 is a process flow diagram of a method 300 for determining the sensor classification of at least one road user 104 located within the surrounding environment of the vehicle 102 according to an exemplary embodiment. FIG. 3 will be described with reference to the components of FIG. 1 and FIG. 2, though it is to be appreciated that the method 300 of FIG. 3 may be used with other system and/or components. The method 300 may begin at block 302, wherein the method 300 includes determining if at least one road user 104 is identified as being located within a surrounding environment of the vehicle 102. As discussed, upon sensing of the road user(s) 104, the vehicle sensors 124 may provide and communicate the sensor data to the VCD 118 to be utilized for various functions within the vehicle 102 and/or external to the vehicle 102.

In an exemplary embodiment, the road user identification module 202 of the road user classification training application 200 may be configured to communicate with the VCD 118 of the vehicle 102 to acquire sensor data that is provided by the vehicle sensors 124. Upon acquiring the sensor data, the road user identification module 202 may analyze the sensor data to determine if at least one road user 104 is sensed within the surrounding environment of the vehicle 102. If it is determined that at least one road user 104 is sensed within the surrounding environment of the vehicle 102, the road user identification module 202 may identify the at least one road user 104 as being located within the surrounding environment of the vehicle 102.

As discussed above, the RSE 106 may send one or more V2I messages, the target vehicle(s) 108 may send one or more V2V messages, and/or the portable device(s) 138 may send one or more V2X messages to the vehicle communication system 128 of the vehicle 102. In an additional embodiment, the road user identification module 202 may be configured to communicate with the VCD 118 of the vehicle 102 to acquire the aforementioned message(s) that is communicated from the RSE 106, the target vehicle(s) 108, and/or the portable device(s) 138 to the vehicle communication system 128 of the vehicle 102. The road user identification module 202 may analyze the message(s) to determine the proximity of the road user(s) 104 to the vehicle 102. In particular, the road user identification module 202 may analyze sensor data included within the message(s) to determine if the target vehicle(s) 108 and/or the NVRU(s) 110 are sensed within a predetermined proximity of the vehicle 102 that includes the surrounding environment of the vehicle 102 to determine if the at least one road user 104 is identified as being located within the surrounding environment of the vehicle 102. Upon determining that the at least one road user 104 is identified within a surrounding environment of the vehicle 102, the road user identification module 202 may communicate data associated with the determination of the identified road user(s) 104 to the sensor classification module 204 of the application 200.

If it is determined that at least one road user is identified as being located within the surrounding environment of the vehicle 102 (at block 302), the method 300 may proceed to block 304, wherein the method 300 may include receiving sensor data with respect to the at least one road user 104. In an exemplary embodiment, upon receiving the data associated with the determination of the identified road user(s) 104 from the road user identification module 202, the sensor classification module 204 may be configured to communicate with the VCD 118 of the vehicle 102 to acquire the sensor data provided by the vehicle sensors 124 to be further analyzed by the neural network 116. As discussed above, in some embodiments, the vehicle systems 126 may augment the sensor data provided by the vehicle sensors 124 with data that is specifically provided by one or more particular vehicle systems 126. In some configurations, the sensor classification module 204 may be configured to additionally acquire the augmented sensor data provided by the vehicle systems 126 in addition to the sensor data provided by the vehicle sensors 124 to provide the data as a package to be further analyzed by the neural network 116.

The method 300 may proceed to block 306, wherein the method 300 may include accessing the neural network 116 and communicating sensor data to the neural network 116. In one embodiment, upon acquiring the sensor data provided by the vehicle sensors 124 from the VCD 118 of the vehicle 102, the sensor classification module 204 may utilize the vehicle communication system 128 to access the neural network 116 stored on the externally hosted server infrastructure 114 though an internet cloud (not shown) using one or more wireless communications protocols. In an alternate embodiment, the sensor classification module 204 may additionally and/or alternatively access the neural network 116 and/or one or more subsets of the neural network 116 stored on the storage unit 122 of the vehicle 102, the storage unit 132 of the target vehicle(s) 108, the storage unit 142 of the portable device(s) 138, and/or the storage unit 150 of the RSE 106.

The method 300 may proceed to block 308, wherein the method 300 may include utilizing the neural network 116 to analyze the sensor data. As discussed above, the neural network machine learning database 158 of the neural network 116 may provide the sensor classifications respectively associated to various types/categories of one or more target vehicles 108 and/or one or more NVRUs 110. In an exemplary embodiment, upon accessing the neural network 116, the sensor classification module 204 may communicate the sensor data to the neural network processing unit 156 of the neural network 116. Upon receipt of the sensor data, the neural network processing unit 156 may process the sensor data using machine learning and by accessing the neural network machine learning database 158 to retrieve the sensor classification of the road user(s) 104 sensed by the vehicle sensors 124 if the sensor classification of the road user(s) is known to the neural network 116. More specifically, the neural network processing unit 156 may use machine learning utilizing the neural network machine learning database 158 to analyze one or more data points that may be extracted from the sensor data by the sensor classification module 204. In particular, the neural network processing unit 156 may analyze categorization information, road user attribute information, dynamics information, and/or environmental information associated with the road user(s) 104 based on the sensor data provided to the neural network processing unit 156 by the sensor classification module 204 when processing the sensor data communicated to the neural network 116 by the sensor classification module 204.

The method 300 may proceed to block 310, wherein the method 300 may include determining if the sensor classification of the at least one road user 104 is known to the neural network 116. Upon processing of the sensor data by the neural network processing unit 156, the neural network processing unit 156 may perform a query based on the data point(s) extracted from the sensor data. The neural network 116 may utilize machine learning to determine and provide (e.g., output) the sensor classification(s) of the road user(s) 104 if the neural network machine learning database 158 includes data associated with the sensor classification(s) (e.g., the sensor classification(s) of the road user(s) 104 is known to the neural network 116). In one embodiment, upon performing the query on the neural network machine learning database 158, if the neural network machine learning database 158 includes the sensor classification(s) of the target vehicle(s) 108 and/or the NVRU(s) 110 based on the processed sensor data, the sensor classification(s) may be outputted from the neural network machine learning database 158 to the neural network processing unit 156. The neural network processing unit 156 may communicate the sensor classifications of each of the one or more road users 104 to the sensor classification module 204. As discussed above, the sensor classification(s) may include specific detail as to categorization details associated with the road user(s) 104, traveling details associated with the road user(s) 104, and subjective details associated with the road user(s) 104 as provided by the neural network 116 based on the sensor data provided by the vehicle sensors 124 of the vehicle 102.

In certain circumstances, when the respective sensor classifications of one or more of the road users 104 may not be known by the neural network 116, the neural network 116 may output a null message(s) that indicates that the sensor classifications of one or more of the road users 104 identified as being located within the surrounding environment of the vehicle 102 may not be known (e.g., the neural network machine learning database 158 does not include data associated with the sensor classification(s) of types/categories of one or more of the target vehicles 108 and/or one or more of the NVRUs 110). In one embodiment, upon performing the query on the neural network machine learning database 158, if the database 158 is not able to output the sensor classification(s) of the target vehicle(s) 108 and/or the NVRU(s) 110 based on the processed sensor data, the null message(s) may be outputted from the neural network machine learning database 158 to the neural network processing unit 156. The neural network processing unit 156 may communicate the null message(s) to the sensor classification module 204. In an exemplary embodiment, the sensor classification module 204 may determine if the sensor classification of the at least one road user 104 is known (or is unknown) based on the receipt of the sensor classification(s) and/or the null message(s) from the neural network processing unit 156 of the neural network 116.

If it is determined that the sensor classification of the at least one road user 104 is unknown to the neural network 116 (at block 310), the method 300 may proceed to block 312, wherein the method 300 may include storing the null message associated with a command to train the neural network 116 with respect to the at least one road user 104. In one embodiment, upon receiving the null message(s) from the neural network 116, the sensor classification module 204 may communicate with the VCD 118 to access the storage unit 122 of the vehicle 102 to store the null message(s). More specifically, the sensor classification module 204 may access the storage unit 122 to store the null message(s) with a data flag that may include a command to train the neural network 116 with respect to the at least one road user 104. This functionality may provide a command for the neural network 116 to be trained with sensor data and profile data communicated through one or more V2X communications protocols by the road user(s) 104 to ensure the neural network 116 may thereafter provide the sensor classification(s) of the road user(s) 104 that may have been previously unknown to the neural network 116.

If it is determined that the sensor classification of the at least one road user 104 is known to the neural network 116 (at block 310), the method 300 may proceed to block 314, wherein the method 300 may include storing the sensor classification of the at least one road user 104. In an exemplary embodiment, upon receiving the sensor classification(s) from the neural network 116, the sensor classification module 204 may communicate with the VCD 118 to access the storage unit 122 to store the sensor classification(s) of the road user(s) 104 as provided by the neural network 116 to be further accessed by the application 200 and/or additional components of the vehicle 102. More specifically, the sensor classification module 204 may access the storage unit 122 to store the sensor classifications that may be respectively associated with each of one or more target vehicles 108 and/or each of one or more NVRUs 110 that may be sensed by the vehicle sensors 124 and identified as being located within the surrounding environment of the vehicle 102. In some embodiments, the sensor classification module 204 may communicate the sensor classification(s) of the road user(s) 104 to the variance determinant module 208 to be further compared to V2X classification(s) of the road user(s) 104, as discussed below.

Figure 4:
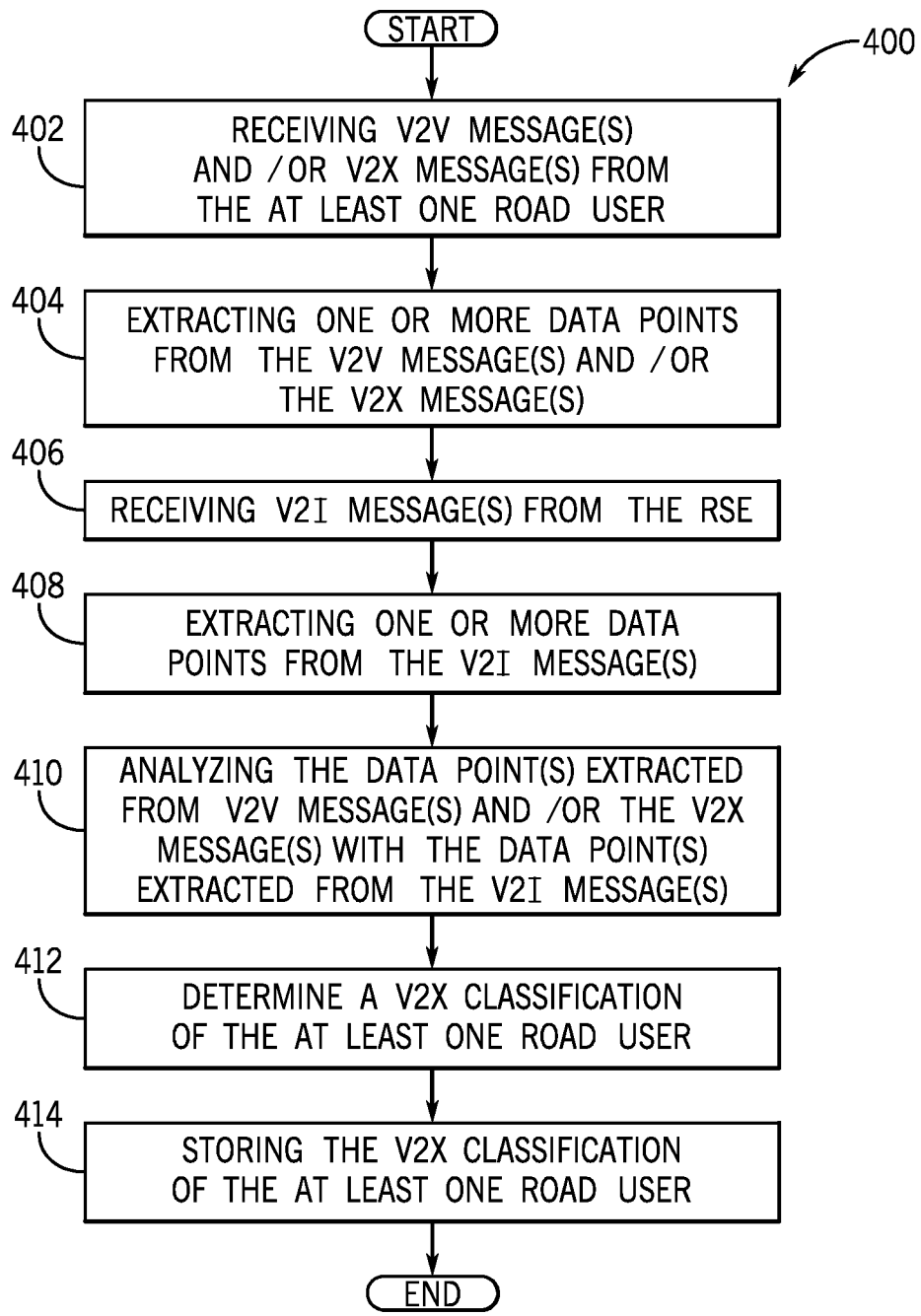
FIG. 4 is a process flow diagram of a method for determining the V2X classification of the at least one road user located within the surrounding environment of the vehicle according to an exemplary embodiment.

FIG. 4 is a process flow diagram of a method 400 for determining the V2X classification of the at least one road user 104 located within the surrounding environment of the vehicle 102 according to an exemplary embodiment. FIG. 4 will be described with reference to the components of FIG. 1 and FIG. 2, though it is to be appreciated that the method 400 of FIG. 4 may be used with other system and/or components. The method 400 may begin at block 402, wherein the method 400 may include receiving V2V messages and/or V2X messages from the at least one road user 104.

As discussed above, the vehicle communication system 136 of the target vehicle(s) 108 may continually communicate one or more V2V messages that include profile data and/or sensor data applicable to the target vehicle(s) 108 through the V2V communications protocol to the vehicle communication system 128 of the vehicle 102. Similarly, the device communication system 146 of the portable device(s) 138 used by the NVRU(s) 110 may continually communicate V2X messages that include profile data and/or sensor data applicable to the NVRU(s) 110 through the V2X communications protocol to the vehicle communication system 128. In one embodiment, the V2X classification module 206 may communicate with the VCD 118 of the vehicle 102 to receive the V2V message(s) and/or the V2X message(s) that are received by the vehicle communication system 128. The VCD 118 may accordingly communicate the V2V message(s) and/or the V2X message(s) that are received by the vehicle communication system 128 to the V2X classification module 206 for analysis.

The method 400 may proceed to block 404, wherein the method 400 may include extracting one or more data points from the V2V message(s) and/or the V2X message(s). In an exemplary embodiment, upon receiving the V2V message(s) and/or the V2X message(s) communicated by the VCD 118 (based on the receipt of the messages by the vehicle communication system 128), the V2X classification module 206 may analyze the received message(s). More specifically, the V2X classification module 206 may extract one or more data points that may be included within the V2V message(s) sent by the target vehicle(s) 108 and/or the V2X message(s) sent by the portable device(s) 138. As discussed above, the one or more data points may pertain to categorization information, attribute information, dynamics information, environmental information, and/or the subjective information that are derived from profile data and/or sensor data (stored on the storage unit 132 of the target vehicle(s) 108 and/or the storage unit 142 of the portable device(s) 138 used by the NVRU(s) 110) and associated with one or more respective target vehicles 108 and/or one or more respective NVRUs 110.

The method 400 may proceed to block 406, wherein the method 400 may include receiving V2I message(s) from the RSE 106. As discussed above, the device communication system 154 of the RSE 106 may continually communicate one or more V2I messages through the V2I communications protocol to the vehicle communication system 128 of the vehicle 102. The V2I message(s) may include sensor data that includes categorization information, attribute information, dynamics information, and/or environmental information associated with the one or more road users 104 sensed by the device sensors 152 to sense the birds-eye/overhead view of the surrounding environment of the vehicle 102 when the vehicle 102 is located within the surrounding environment of the RSE 106. In one embodiment, the V2X classification module 206 may communicate with the VCD 118 of the vehicle 102 to receive the V2I message(s) that are communicated to the vehicle communication system 128 from the RSE 106. The VCD 118 may accordingly communicate one or more of the V2I messages to the V2X classification module 206 for analysis.

The method 400 may proceed to block 408, wherein the method 400 may include extracting one or more data points from the V2I message(s). In an exemplary embodiment, upon receiving the V2I message(s) communicated by the VCD 118 (based on the receipt of the messages by the vehicle communication system 128), the V2X classification module 206 may analyze the received V2I message(s). More specifically, the V2X classification module 206 may extract one or more data points that may be included within the V2I message(s) sent by the RSE 106 to the vehicle 102. As discussed above, the one or more data points may pertain to categorization information, attribute information, dynamics information and environmental information that are determined by the device sensors 152 of the RSE 106 and associated with one or more respective target vehicles 108 and/or one or more respective NVRUs 110 identified as being located within the surrounding environment of the vehicle 102.

The method 400 may proceed to block 410, wherein the method 400 may include aggregating the data point(s) extracted from the V2V message(s) and/or the V2X message(s) with the data point(s) extracted from the V2I message(s). In an exemplary embodiment, the V2X classification module 206 may aggregate the one or more data points extracted from the V2V message(s) and/or the V2X message(s) with the one or more data points extracted from the V2I message(s). More specifically, the V2X classification module 206 may analyze the data point(s) received from the target vehicle(s) 108 and/or the portable device(s) 138 used by the NVRU(s) 110. Additionally, the V2X classification module 206 may analyze the data point(s) received from the RSE 106 based on the sensing of the birds-eye/overhead view of the surrounding environment of the vehicle 102 when the vehicle 102 is located within a proximity (e.g., within 300 yards) of the roadway infrastructure 112.

In one embodiment, upon analyzing the data point(s), the V2X classification module 206 may utilize control logic to determine data point(s) extracted from the V2V message(s) and/or the V2X message(s) that include overlaying data (e.g., data points that pertain to similar characteristics) with respect to the categorization information, attribute information, dynamics information, and environmental information that may be included within the data point(s) extracted from the V2I message(s). Upon determining the data point(s) from the V2V message(s) and/or the V2X message(s) that include overlying data with the data point(s) extracted from the V2I message(s), the V2X classification module 206 may aggregate the overlapping data points and may add any subjective information included within the V2V message(s) and/or V2X message(s) to output aggregated data points. The aggregation of the data points may provide holistic data associated with the categorization information, attribute information, dynamics information, and/or environmental information in addition to the subjective information if it is determined that is associated with the road user(s) 104 identified as being located within the surrounding environment of the vehicle 102 and communicated by the road user(s) 104 to the vehicle 102.

The method 400 may proceed to block 412, wherein the method 400 may include determining a V2X classification of the at least road user 104. In an exemplary embodiment, upon outputting the aggregated data point(s), the V2X classification module 206 may utilize the control logic to further analyze the aggregated data points to determine the V2X classifications associated to each of the one or more target vehicles 108 and/or each of the one or more NVRUs 110 identified as being located within the surrounding environment of the vehicle 102. As discussed above, the V2X classification(s) may include specific detail as to categorization details associated with the road user(s) 104, traveling details associated with the road user(s) 104, and subjective details associated with the road user(s) 104 as determined based on the categorization information, attribute information, dynamics information, and/or the subjective information included within the message(s) received by the vehicle 102 through the one or more V2X communications protocols on the vehicle communications network.

The method 400 may proceed to block 414, wherein the method 400 may include storing the V2X classification of the at least one road user 104. In an exemplary embodiment, upon determining the V2X classification(s), the V2X classification module 206 may communicate with the VCD 118 to access the storage unit 122 to store the V2X classification(s) of the road user(s) 104 to be further accessed by the application 200 and/or additional components of the vehicle 102. More specifically, the V2X classification module 206 may access the storage unit 122 to store the V2X classifications that may be respectively associated with each of one or more target vehicles 108 and/or each of one or more NVRUs 110 that may be sensed by the vehicle sensors 124 and identified as being located within the surrounding environment of the vehicle 102. In some embodiments, the V2X classification module 206 may communicate the V2X classification(s) of the road user(s) 104 to the variance determinant module 208 to be further compared to sensor classification(s) of the road user(s) 104, as discussed below.

Figure 5:
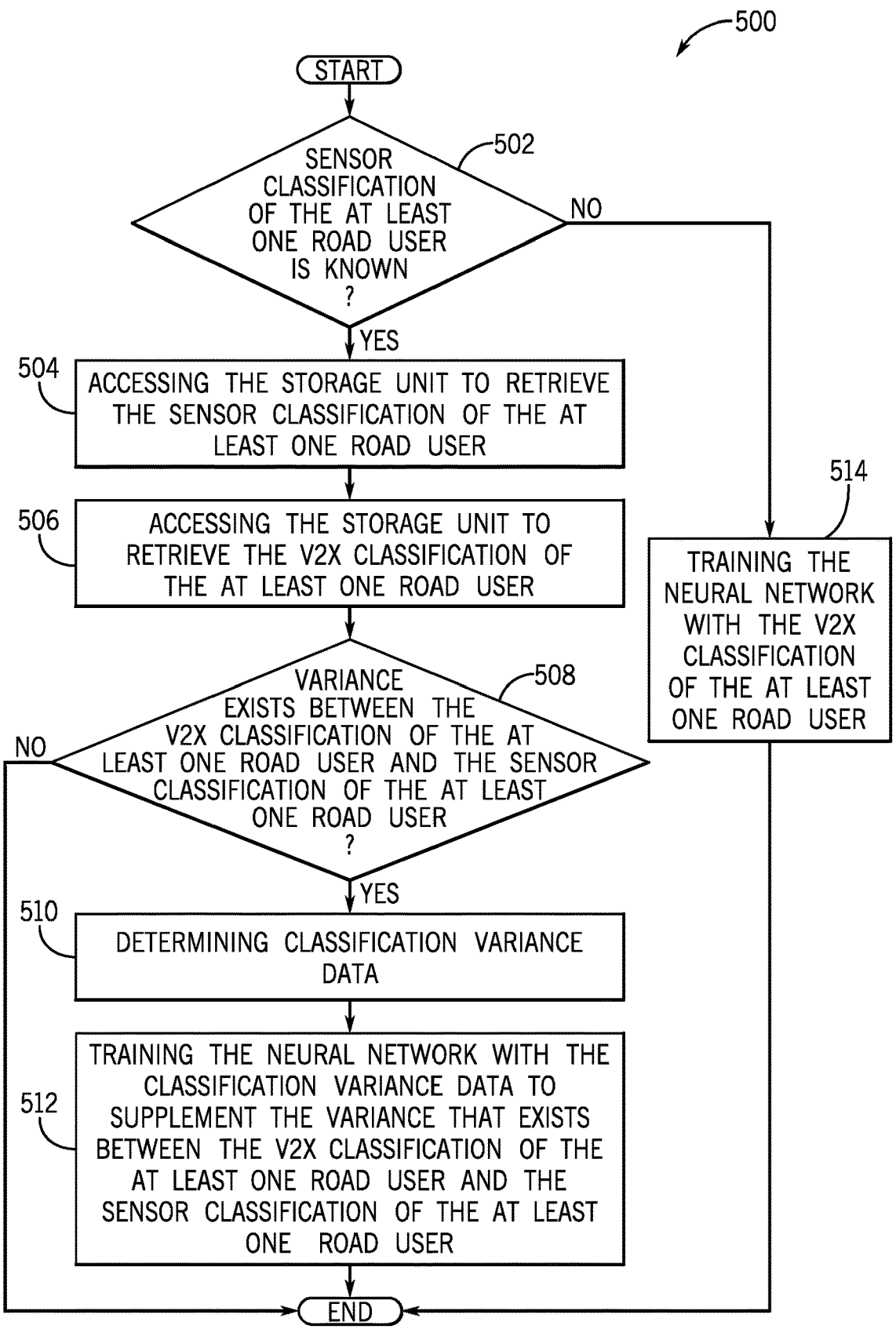
FIG. 5 is a process flow diagram of a method for determining if a variance exists between the sensor classification and the V2X classification of the at least one road user and training a neural network according to an exemplary embodiment.

FIG. 5 is a process flow diagram of a method 500 for determining if a variance exists between the sensor classification and the V2X classification of the at least one road user 104 and training the neural network according to an exemplary embodiment. FIG. 5 will be described with reference to the components of FIG. 1 and FIG. 2, though it is to be appreciated that the method 500 of FIG. 5 may be used with other system and/or components. The method 500 may proceed to block 502, wherein the method 500 may include determining if the sensor classification of the at least one road user 104 is known. In one embodiment, the variance determinant module 208 may communicate with the sensor classification module 204 to determine if the sensor classification(s) of the road user(s) 104 is known based on the determination made by the sensor classification module 204 (as discussed above with respect to block 310).

If it is determined that the sensor classification of the at least one road user is known (at block 502), the method 500 may proceed to block 504, wherein the method 500 may include accessing the storage unit 122 to retrieve the sensor classification of the at least one road user 104. As discussed above (with respect to block 314 of the method 300), the sensor classification(s) of the road user(s) 104 may be stored on the storage unit 122 upon determining that the sensor classification of the at least one road user 104 is known by the neural network 116. In an exemplary embodiment, the variance determinant module 208 of the road user classification training application 200 may access the storage unit 122 of the vehicle 102 to retrieve the sensor classification(s) of the road user(s) 104 identified as being located within the surrounding environment of the vehicle 102.

The method 500 may proceed to block 506, wherein the method 500 may include accessing the storage unit 122 to retrieve the V2X classification of the at least one road user 104. As discussed above (with respect to block 414 of the method 400), the V2X classification(s) of the road user(s) 104 may be stored on the storage unit 122 upon determining the V2X classification(s) by the V2X classification module 206. In an exemplary embodiment, the variance determinant module 208 may access the storage unit 122 of the vehicle 102 to retrieve the V2X classification(s) of the road user(s) 104 identified as being located within the surrounding environment of the vehicle 102.

The method 500 may proceed to block 508, wherein the method 500 may include determining if a variance exists between the V2X classification of the at least one road user 104 and the sensor classification of the at least one road user 104. In an exemplary embodiment, upon retrieving the sensor classification(s) and the V2X classification(s) of the road user(s) 104 (as discussed above with respect to blocks 504 and 506), the variance determinant module 208 may analyze and compare the sensor classification(s) with the V2X classification(s) of the respective road user(s) 104. More specifically, the variance determinant module 208 may compare specific data points included within the V2X classification(s) of the road user(s) 104 with data points included within the sensor classification(s) of the road user(s) 104 to determine if a variance (e.g., difference in data included within the V2X classification and sensor classification) exists between the V2X classification(s) of the road user(s) 104 and the sensor classification(s) of the road user(s) 104.

In one embodiment, upon comparing the specific data points included within the V2X classification(s) of the road user(s) 104 and the sensor classification(s) of the road user(s) 104, the variance determinant module 208 may determine that the variance exists between the V2X classification(s) and the sensor classification(s) based on a delta (e.g., differences in one or more pieces of information between) between the categorization details associated with the road user(s) 104, traveling details associated with the road user(s) 104, and/or subjective details associated with the road user(s) 104 included within the V2X classification(s) as compared to the sensor classification(s). In other words, the variance determinant module 208 may determine that the variance exists based on if on one or more data points representing information that may be included within the V2X classification(s) match with one or more data points that may be included within the sensor classification(s) as provided to the sensor classification module 204 by the neural network 116.

If it is determined that the variance exists between the V2X classification of the at least one road user 104 and the sensor classification of the at least one road user 104 (at block 508), the method 500 may proceed to block 510, wherein the method 500 may include determining classification variance data. In one or more embodiments, the variance determinant module 208 may determine classification variance data associated with the variance to the neural network training module 210. The classification variance data may include specific data points that are determined from the analysis of the V2X classification(s) of the road user(s) 104 that may not be included within the sensor classification(s) of the respective road user(s) 104, as provided by the neural network 116. More specifically, the variance determinant module 208 may determine the classification variance data as data that includes categorization information, road user attribute information, dynamics information, environmental information, and/or subjective information included within the categorization details, traveling details, and the subjective details that are included within the V2X classification(s) of the road user(s) 104 and excluded from the sensor classification(s) of the road user(s) 104. In other words, the classification variance data may include the aforementioned information that is included within the categorization details associated with the road user(s) 104, the traveling details associated with the road user(s) 104 and the subjective details associated with the road user(s) 104 as included within the V2X classification(s) of the road user(s) 104 that may supplement the variance that exists between the V2X classification(s) and the sensor classification(s) of the road user(s) 104 located within the surrounding environment of the vehicle(s) 102.

The method 500 may proceed to block 512, wherein the method 500 may include training the neural network 116 with the classification variance data to supplement the variance that exists between the V2X classification of the at least one road user 104 and the sensor classification of the at least one road user 104. In an exemplary embodiment, upon determining the classification variance data, the variance determinant module 208 may communicate the classification variance data to the neural network training module 210. In particular, the neural network training module 210 may communicate with the neural network processing unit 156 to train the neural network 116 with the classification variance data.

In one embodiment, the neural network training module 210 may communicate the classification variance data in the form of one or more classification variance data points that include the categorization information, road user attribute information, dynamics information, the environmental information, and/or the subjective information that supplements the variance of respective data that exists between the V2X classification(s) and the sensor classification(s) of the road user(s) 104. The neural network training module 210 may train the neural network 116 by communicating with the neural network processing unit 156 to update the sensor classifications of the one or more respective road users 104 stored on the neural network machine learning database 158 with the classification variance data point(s) that pertain to the target vehicle(s) 108 and/or the NVRU(s) 110 identified as being located within the surrounding environment of the vehicle 102. Consequently, the neural network 116 is updated with the classification variance data in real-time to supplement the variance that exists between the sensor classification(s) and the V2X classification(s) to ensure that sensor data is provided by the neural network 116 to more accurately classify the target vehicle(s) 108 and/or the NVRU(s) based on sensor data provided by the vehicle sensors 124 of the vehicle 102. More particularly, upon training the neural network 116, the sensor classification(s) provided by the neural network 116 and the V2X classification(s) determined by the application 200 are updated with the classification variance data to include matching details (since the variance no longer exists) as to the categorization details, the traveling details, and the subjective details associated with the road user(s) 104.

Referring again to block 502 of the method 500, if it is determined that the sensor classification of the at least one road user 104 is unknown, the method 500 may proceed to block 514, wherein the method 500 may include training the neural network with the V2X classification of the at least one road user 104. As discussed above, when the sensor classification(s) of the target vehicle(s) 108 and/or the NVRU(s) 110 is unknown to the neural network 116 (e.g., based on a new type/category of road user 104), the sensor classification module 204 may store the null message(s) with the data flag that may include a command to train the neural network 116 with respect to the at least one road user 104 (as discussed above with respect to block 312 of the method 300).

In one embodiment, when it is determined that the sensor classification(s) is unknown, the variance determinant module 208 may access the storage unit 122 and to retrieve the null message(s) stored by the sensor classification module 204. Upon retrieving the null message(s), the variance determinant module 208 may responsively access the storage unit 122 to retrieve the V2X classification(s) of the road user(s) 104 (in a similar manner as discussed with respect to block 506 of the method 500). Upon retrieving the V2X classification(s) of the road user(s) 104, the variance determinant module 208 may communicate one or more data points extracted from the V2X classification(s) along with the data included within the data flags of the null message(s). The neural network training module 210 may responsively communicate with the neural network processing unit 156 to train the neural network 116 with the V2X classification(s) of the road user(s) 104.

In one embodiment, the neural network training module 210 may communicate the one or more data points extracted from the V2X classification(s) that may include the categorization information, road user attribute information, dynamics information, the environmental information, and/or subjective information that may be used to provide the sensor classification(s) of the road user(s) 104 subsequent to the training of the neural network 116. Stated differently, the neural network 116 may be trained to ensure that the sensor classification(s) of the road user(s) 104 that may include specific details as to the categorization details, traveling details, and subjective details associated with the road user(s) 104 that were previously unknown to the neural network 116 are known upon the training of the neural network 116.

The neural network training module 210 may train the neural network 116 by communicating with the neural network processing unit 156 to create new sensor classifications of the one or more respective road users 104 that are stored on the neural network machine learning database 158. Consequently, the neural network 116 is updated with the data point(s) extracted from the V2X classification(s) in real-time to ensure that sensor data is provided by the neural network 116 to classify the target vehicle(s) 108 and/or the NVRU(s) based on sensor data provided by the vehicle sensors 124 of the vehicle 102.

In one or more embodiments, the neural network training module 210 may communicate the classification variance data in the form of one or more classification variance data points. The one or more classification variance data points not only supplement the variance and/or provide data when the sensor classification of the at least one road user 104 is unknown, but also provide multiple points of data with respect to the categorization information, road user attribute information, dynamics information, and/or the environmental information that may be updated to the neural network 116. The classification variance data may include a complete data set associated with the categorization information, road user attribute information, dynamics information, and/or the environmental information associated with the road user(s) 104 as included within the V2X classification(s) of the road user(s) 104 that may add additional details associated with the road user(s) 104 to enhance the sensor classifications (e.g., based on new or updated data that may be already be included but may be added or updated to the neural network machine learning database 158).

Figure 6:
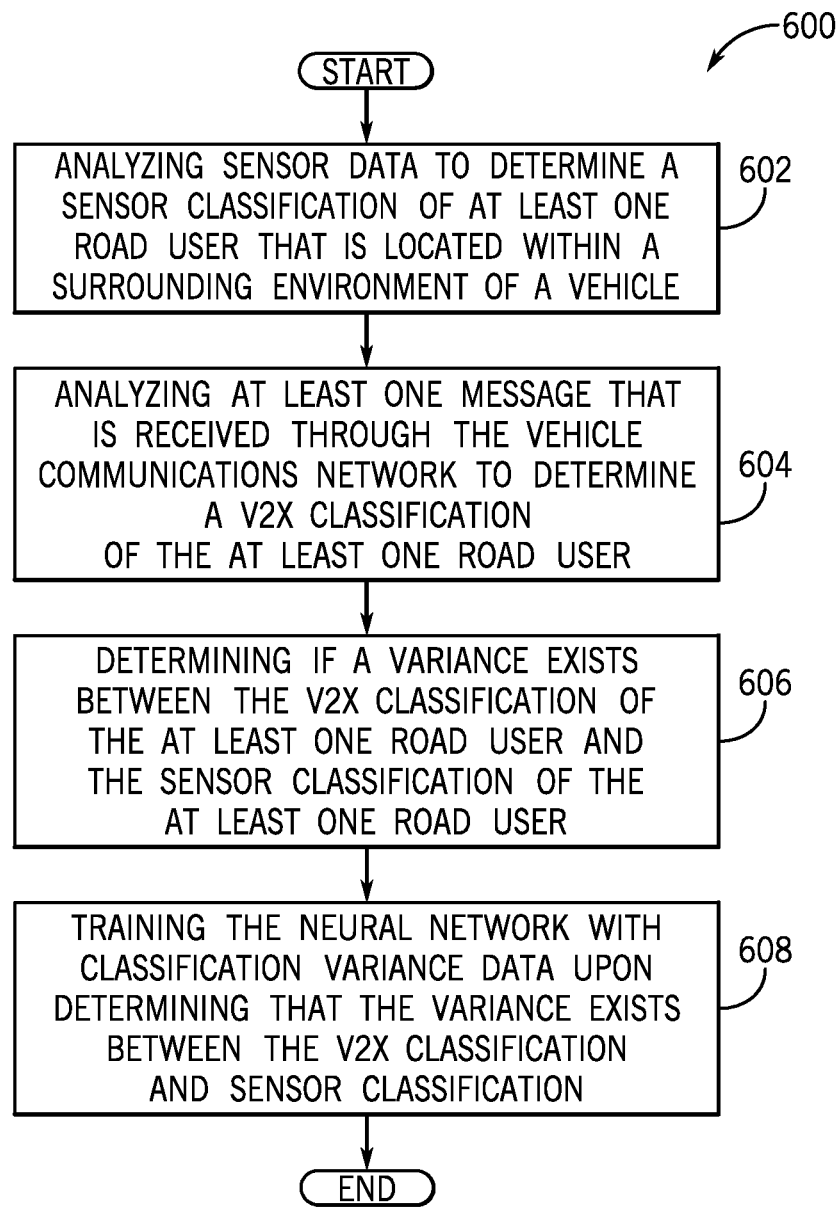
FIG. 6 is a process flow diagram of a method for providing road user classification training using the vehicle communications network according to an exemplary embodiment.

FIG. 6 is a process flow diagram of a method 600 for providing road user classification training using a vehicle communications network according to an exemplary embodiment. FIG. 6 will be described with reference to the components of FIG. 1 and FIG. 2, though it is to be appreciated that the method 600 of FIG. 6 may be used with other system and/or components. The method 600 may begin at block 602, wherein the method 600 may include analyzing sensor data to determine a sensor classification of at least one road user 104 that is located within a surrounding environment of a vehicle 102. In one embodiment, the sensor data is provided by the vehicle 102 and analyzed by the neural network 116 to determine the sensor classification.

The method 600 may proceed to block 604, wherein the method 600 may include analyzing at least one message that is received through the vehicle communications network to determine a V2X classification of the at least one road user 104. In one embodiment, the at least one message is associated with the at least one road user 104. The method 600 may proceed to block 606, wherein the method 600 may include determining if a variance exists between the V2X classification of the at least one road user 104 and the sensor classification of the at least one road user 104.

The method 600 may proceed to block 608, wherein the method 600 may include training the neural network 116 with classification variance data upon determining that the variance exists between the V2X classification and sensor classification. In one embodiment, the neural network 116 is updated to more accurately classify the at least one road user 104. In particular, training the neural network 116 with the classification variance data supplements the variance that exists between the V2X classification and the sensor classification of the at least one road user 104.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing road user classification training using a vehicle communications network, comprising:

analyzing sensor data to determine a sensor classification of at least one road user, wherein the sensor data is provided by the vehicle and analyzed by a neural network to determine the sensor classification;

analyzing at least one message that is received through the vehicle communications network to determine a vehicle-to-everything (V2X) classification of the at least one road user, wherein the at least one message is associated with the at least one road user;

determining if a variance exists between the V2X classification of the at least one road user and the sensor classification of the at least road user, wherein data points included within the V2X classification of the at least one road user are compared against data points included within the sensor classification of the at least one road user provided by the neural network to determine if a delta exists between the data points included within the V2X classification and the data points included within the sensor classification; and training the neural network with classification variance data upon determining that the variance exists between the V2X classification and sensor classification based on the delta between the data points included within the V2X classification and the data points included within the sensor classification, wherein training the neural network with the classification variance data supplements the variance that exists between the V2X classification and the sensor classification of the at least one road user.

2. The computer-implemented method of claim 1, wherein the at least oneroad user includes at least one of: a target vehicle, and a non-vehicular road user (NVRU), wherein the at least one road user is identified to be located within the surrounding environment of the vehicle based on the sensor data.

3. The computer-implemented method of claim 2, wherein analyzing sensor data to determine the sensor classification includes accessing a neural network machine learning database to analyze at least one data point that is extracted from the sensor data, wherein the neural network machine learning database includes sensor classification data that is accessed and analyzed to determine the sensor classification of the at least one road user.

4. The computer-implemented method of claim 3, wherein the at least one message that is received through vehicle communications network to determine the V2X classification includes a vehicle-to-vehicle (V2V) message communicated from the target vehicle, a vehicle-to-everything (V2X) message communicated from a portable device used by the NVRU, and a vehicle-to-infrastructure (V2I) message communicated from a road side equipment operably connected to roadway infrastructure.

5. The computer-implemented method of claim 4, wherein analyzing at least one message that is received through vehicle communications network to determine the V2X classification includes extracting at least one data point from the V2I message and at least one of: the V2V message, and the V2X message, wherein the at least one data point extracted from the V2I message is aggregated with at least one data point extracted from at least one of: the V2V message, and the V2X message to determine the V2X classification of the at least one road user.

6. The computer-implemented method of claim 5, wherein determining if the variance exists includes analyzing and comparing at least one data point included within the sensor classification of the at least one road user with at least one data point included within the V2X classification of the at least one road user and determining if a delta exists between at least one of: categorization details, traveling details, and subjective details associated with the at least one road user included within the V2X classification and the sensor classification.

7. The computer-implemented method of claim 6, wherein the classification variance data includes categorization information, road user attribute information, dynamics information, environmental information, and subjective information included within the categorization details, the traveling details, and the subjective details that are included within the V2X classification of the at least one road user and are excluded from the sensor classification of the at least one roaduser.

8. The computer-implemented method of claim 7, wherein training the neural network with classification variance data includes accessing the neural network machine learning database and updating the sensor classification of the at least one road user, wherein at least one data point of the sensor classification of the at least one road user is updated to include the classification variance data.

9. The computer-implemented method of claim 1, further including training the neural network with the V2X classification of the at least one road user when it is determined that the sensor classification of the at least one road user is unknown to the neural network.

10. A system for providing road user classification training using a vehicle communications network, comprising:
a memory storing instructions when executed by a processor cause the processor to:
analyze sensor data to determine a sensor classification of at least one road user, wherein the sensor data is provided by the vehicle and analyzed by a neural network to determine the sensor classification;
analyze at least one message that is received through the vehicle communications network to determine a vehicle-to-everything (V2X) classification of the at least one road user, wherein the at least one message is associated with the at least one road user;
determine if a variance exists between the V2X classification of the at least one road user and the sensor classification of the at least road user, wherein data points included within the V2X classification of the at least one road user are compared against data points included within the sensor classification of the at least one road user provided by the neural network to determine if a delta exists between the data points included within the V2X classification and the data points included within the sensor classification; and
train the neural network with classification variance data upon determining that the variance exists between the V2X classification and sensor classification based on the delta between the data points included within the V2X classification and the data points included within the sensor classification, whereintraining the neural network with the classification variance data supplements the variance that exists between the V2X classification and the sensor classification of the at least one road user.

11. The system of claim 10, wherein the at least one road user includes at least one of: a target vehicle, and a non-vehicular road user (NVRU), wherein the at least one road user is identified to be located within the surrounding environment of the vehicle based on the sensor data.

12. The system of claim 11, wherein analyzing sensor data to determine the sensor classification includes utilizing a neural network machine learning database to analyze at least one data point that is extracted from the sensor data, wherein the neural network machine learning database includes sensor classification data that is accessed and analyzed to determine the sensor classification of the at least one road-user.

13. The system of claim 12, wherein the at least one message that is received through vehicle communications network to determine the V2X classification includes a vehicle-to-vehicle (V2V) message communicated from the target vehicle, a vehicle-to-everything (V2X) message communicated from a portable device used by the NVRU, and a vehicle-to-infrastructure (V2I) message communicated from a road side equipment operably connected to roadway infrastructure.

14. The system of claim 13, wherein analyzing at least one message that is received through vehicle communications network to determine the V2X classification includes extracting at least one data point from the V2I message and at least one of: the V2V message, and the V2X message, wherein the at least one data point extracted from the V2I message is aggregated with at least one data point extracted from at least one of: the V2V message, and the V2X message to determine the V2X classification of the at least one road user.

15. The system of claim 14, wherein determining if the variance exists includes analyzing and comparing at least one data point included within the sensor classification of the at least one road user with at least one data point included within the V2X classification of the at least one road user and determining if a delta exists between at least one of: categorization details, traveling details, and subjective details associated with the at least one road user included within the V2X classification and the sensor classification.

16. The system of claim 15, wherein the classification variance data includes categorization information, road user attribute information, dynamics information, environmental information, and subjective information included within the categorization details, the traveling details, and the subjective details that are included within the V2X classification of the at least one road user and are excluded from the sensor classification of the at least one road user.

17. The system of claim 16, wherein training the neural network with classification variance data includes accessing the neural network machine learning database and updating the sensor classification of the at least one road user, wherein at least one data point of the sensor classification of the at least one road user is updated to include the classification variance data.

18. The system of claim 10, further including training the neural network with the V2X classification of the at least one road user when it is determined that the sensor classification of the at least one road user is unknown to the neural network.

19. A non-transitory computer readable storage medium storing instructions that when executed by a computer, which includes a processor, perform a method, the method comprising:
analyzing sensor data to determine a sensor classification of at least one roaduser, wherein the sensor data is provided by a vehicle and analyzed by a neural network to determine the sensor classification;

analyzing at least one message that is received through a vehiclecommunications network to determine a vehicle-to-everything (V2X) classification of the at least one road user, wherein the at least one message is associated with the at least one road user;

determining if a variance exists between the V2X classification of the at least one road user and the sensor classification of the at least road user, wherein data points included within the V2X classification of the at least one road user are compared against data points included within the sensor classification of the at least one road user provided by the neural network to determine if a delta exists between the data points included within the V2X classification and the data points included within the sensor classification; and training the neural network with classification variance data upon determining that the variance exists between the V2X classification and sensor classification based on the delta between the data points included within the V2X classification and the data points included within the sensor classification, wherein training the neural network with the classification variance data supplements the variance that exists between the V2X classification and the sensor classification of the at least one road user.

20. The non-transitory computer readable storage medium of claim 19, wherein the classification variance data includes categorization information, road user attribute information, dynamics information, environmental information, and subjective information included within categorization details, traveling details, and subjective details that are included within the V2X classification of the at least one road user and are excluded from the sensor classification of the at least oneroad user.

* * * * *